(12) United States Patent
Syed et al.

(10) Patent No.: US 11,663,023 B2
(45) Date of Patent: May 30, 2023

(54) SYSTEMS AND METHODS FOR DYNAMIC ARTIFICIAL INTELLIGENCE (AI) GRAPHICAL USER INTERFACE (GUI) GENERATION

(71) Applicant: The Travelers Indemnity Company, Hartford, CT (US)

(72) Inventors: Nabeel A. Syed, East Haven, CT (US); Jason R. Vermes, West Hartford, CT (US); Carolyn C. Capshaw, Fairfield, CT (US); Ryan J. O'Connor, Tolland, CT (US); Zihan Ye, Manchester, CT (US); Sereres C. Johnston, Riverside, IL (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 17/382,338

(22) Filed: Jul. 21, 2021

(65) Prior Publication Data

US 2023/0025371 A1 Jan. 26, 2023

(51) Int. Cl.
*G06F 9/451* (2018.01)
*G06N 20/00* (2019.01)
*G06F 18/21* (2023.01)

(52) U.S. Cl.
CPC .......... *G06F 9/451* (2018.02); *G06F 18/2185* (2023.01); *G06N 20/00* (2019.01)

(58) Field of Classification Search
CPC ....... G06F 9/451; G06N 20/00; G06K 9/6264
See application file for complete search history.

(56) References Cited

U.S. PATENT DOCUMENTS

| | | | | |
|---|---|---|---|---|
| 9,461,972 B1* | 10/2016 | Mehta | ................ | H04L 63/0435 |
| 2014/0075336 A1* | 3/2014 | Curtis | ................... | H04L 41/22 |
| | | | | 715/753 |
| 2019/0155894 A1* | 5/2019 | Gandhi | ................ | G06F 40/106 |
| 2021/0174148 A1* | 6/2021 | Raveh | ................ | G06V 10/7788 |
| 2021/0278932 A1* | 9/2021 | Sos-Munoz | ............ | G06N 20/00 |
| 2022/0198182 A1* | 6/2022 | Semenov | .............. | G06F 40/131 |

OTHER PUBLICATIONS

Website: "https://xgboost.readthedocs.io/en/latest/" download date Oct. 28, 22020; 1 pps.

* cited by examiner

*Primary Examiner* — Beau D Spratt
(74) *Attorney, Agent, or Firm* — Rowan Tree Law Group, PLLC; Carson C. K. Fincham

(57) ABSTRACT

Systems, apparatus, interfaces, methods, and articles of manufacture that provide for Artificial Intelligence (AI) User Interface (UI) and/or Graphical User Interface (GUI) generation.

28 Claims, 12 Drawing Sheets

440 ⇘

444a

| ASSET ID | TYPE | ROOF AGE | LOCATION | CLASS | NARRATIVE |
|---|---|---|---|---|---|
| 444a-1 | 444a-2 | 444a-3 | 444a-4 | 444a-5 | 444a-6 |
| CT-DH77 | HOME | 22 | 123 MAIN ST. | PI01 | STICK-BUILT HOME WITH 22-YR OLD ROOF... |
| MD-8437 | AUTO | N/A | 43.1, 62.9 | 37 | PRE-OWNED HONDA CRV WITH EX TRIM AND 33K... |
| 76D001 | STRUCT | 5 | 21032 | 5945 | COMMERCIAL BUILDING RENTED TO RETAIL... |

A

444b

| ASSESSMENT ID | SCORE | ASSET ID | VARIABLE ID | VARIABLE SCORE |
|---|---|---|---|---|
| 444b-1 | 444b-2 | 444b-3 | 444b-4 | 444b-5 |
| AUG01-H7G5 | 2100 | CT-DH77 | NUM-001 | 93 |
| AUG01-H7G5 | 2100 | CT-DH77 | CALC-001 | 75 |
| AUG01-H7G5 | 2100 | CT-DH77 | NUM-002 | 69 |
| AUG01-H7G5 | 2100 | CT-DH77 | TEXT-238 | 45 |

B

444c

| UI ELEMENT ID | VARIABLE ID | TYPE | HORIZ. SIZE | VERT. SIZE | PRIORITY |
|---|---|---|---|---|---|
| 444c-1 | 444c-2 | 444c-3 | 444c-4 | 444c-5 | 444c-6 |
| 12080001 | NUM-001 | PICKLIST | 64 | 16 | 1 |
| 12080001 | TEXT-238 | BOX | 128 | 128 | 119 |
| 12080003 | TEXT-923 | DROPDWN | 64 | 64 | 22 |
| 12080004 | NUM-001 | RADIO | 12 | 12 | 56 |
| 12080005 | NUM-328 | BOX | 256 | 128 | 3 |

AI RENEWAL DECISION / REASONING
622a

RENEW 624

*Reasoning Drivers:*

| Underwriting Tier (626a) | CAT Risks (626c) |
| Recoverable Depreciation (626b) | Cause of Loss (626d) |

*Reasoning:*

It has been determined based on a weighing of factors as indicated in the ranked grouping above that the underwriting tier strongly weighs in favor of policy renewal and that the claim history as evidenced by the Cause of Loss from the two (2) claims filed during the previous policy periods does not significantly detract from...
628

( Edit ) ( Agree/Sign ) ( Back )
630a      630b        630c

*FIG. 6*

SYSTEMS AND METHODS FOR DYNAMIC ARTIFICIAL INTELLIGENCE (AI) GRAPHICAL USER INTERFACE (GUI) GENERATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various processes in many different industries utilize Graphical User Interface (GUI) elements to provide efficiencies that would otherwise not be practicable. Complex decision-making processes, for example, often require analysis and comparison of a large number of data values from disparate data sources. In some cases, GUI systems may be leveraged to increase the speed at which an analyst may traverse the large amounts of relevant data. Such systems, however, are designed to improve the end-user experience and accordingly often do so at the expense of computational resources.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 4 is a block diagram of an example data storage structure according to some embodiments;

FIG. 6 is a diagram of an example interface according to some embodiments;

DETAILED DESCRIPTION

I. Introduction

Figure 1:
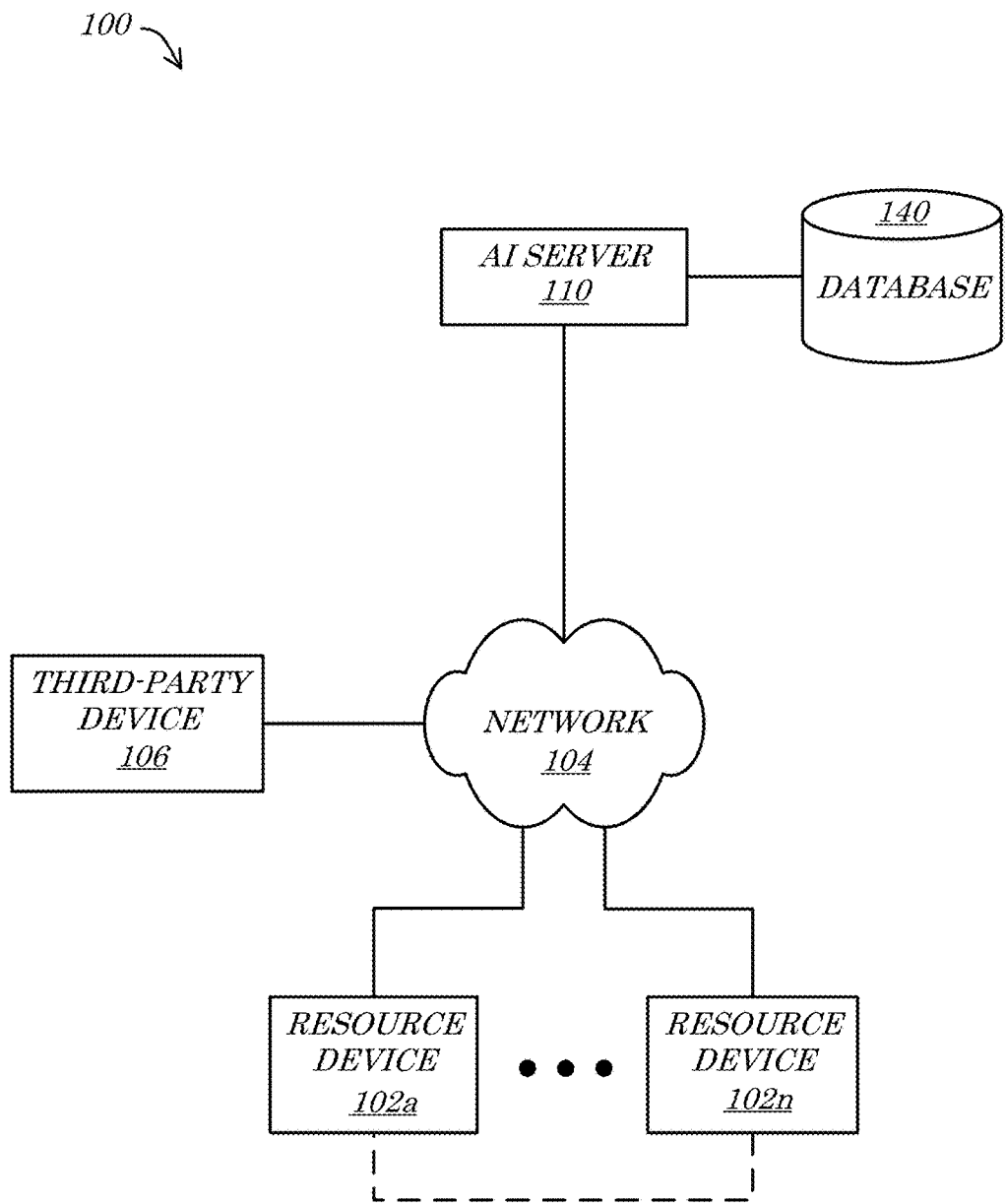
FIG. 1 is a block diagram of a system according to some embodiments.

Embodiments described herein are descriptive of systems, apparatus, methods, interfaces, and articles of manufacture for Artificial Intelligence (AI) User Interface (UI) and/or Graphical User Interface (GUI) generation. Embodiments may utilize one or more AI Machine Learning (ML) models, for example, to automatically acquire, process, analyze, and/or present large numbers of variables and/or data values required to conduct one or more assessments. In some embodiments, the AI ML model(s) may automatically construct one or more GUI instances based on a dynamic analysis of the variables/data and/or values thereof. Systems and methods in accordance with embodiments described herein may, for example, automatically select a plurality of dynamic data-driven GUI elements and arrange and/or configure the elements to define and/or generate a GUI instance that is output to a user.

Previous implementations of GUI-enabled processes often leverage a different GUI (and/or other type of interface) for each data source that requires analysis. Such systems are static and specifically coded for each known data source and/or type, and which of these multiple interfaces the user consults is a decision left to each individual user/analyst. In processes requiring multiple, complex decision-making results, the decisions made by a multitude of analysts lack uniformity. Many analysts may also choose interface options and/or utilize decision workflow processes that are not efficient. In cases where an analyst is assigned a plurality of projects to analyze there is often no way for the analyst to sort or triage the project pool, such that the analyst must simply go through the projects chronologically or randomly, with no insight as to the amount of time that may be required for each particular analysis project. As analysis times often vary considerably, such lack of insight creates a significant inefficiency for a single analyst, which in turn is multiplied by the number of analysts engaged by an employer. These shortcomings are often magnified in the case that one or more of the variables and/or data sets requiring analysis comprises unstructured data, such as freeform text, prose, etc.

According to embodiments described herein, these and other deficiencies are remedied by implementation of specifically programmed AI-generated UI and/or GUI elements that greatly enhance the functionality of the electronic processing systems that may be utilized to conduct various types of multi-variable assessments. As described herein, for example, AI ML models and/or rule sets may be interfaced with a library of GUI components to provide AI-based GUI generation via which users/analysts may (i) be automatically presented with a subset of dynamically selected variables and/or data values relevant to an assessment, (ii) be automatically presented with a ranked listing of projects for assessment, (iii) be automatically presented with a dynamically selected subset of GUI elements via which the subset of dynamically selected variable/data values relevant to an assessment are output, and/or (v) be automatically presented with a suggested AI-generated textual summary for each assessment project. In such a manner, for example, even highly complex assessments requiring analysis of a large number (e.g., from twenty (20) to more than one hundred (100)) of variables and/or data elements may be dynamically (e.g., in real-time or near real-time) facilitated and/or automatically conducted with a speed, uniformity, and efficiency that were not previously possible utilizing typical systems. Increased efficiencies in assessment processing may greatly reduce labor costs, minimize resource waste, increase the accuracy and/or uniformity of individual assessments, and accordingly increase assessment satisfaction and/or result levels. Such efficiencies may require fewer processing and/or data storage resources and may also or alternatively reduce required processing bandwidth constraints required for assessment processing.

II. AI GUI Generation Systems

Referring first to FIG. 1, a block diagram of a system 100 according to some embodiments is shown. In some embodiments, the system 100 may comprise a plurality of resource devices 102a-n in communication via or with a network 104. According to some embodiments, the system 100 may comprise a third-party device 106, and/or an AI server 110, e.g., any or all of which may be in communication with or via the network 104. In some embodiments, any or all of the devices 102a-n, 106, 110 may comprise and/or be in communication with a data storage device, memory device, and/or database 140. According to some embodiments, communications between and/or within the devices 102a-n, 106, 110, 140 of the system 100 may be utilized to (i) identify and/or select an ML training data set, (ii) train one or more AI ML models based on the training data set(s), (iii) utilize the AI ML model to analyze a plurality of assessment projects, (iv) score each variable utilized to conduct each assessment (e.g., based on a statistical measure of the relative significance of each variable), (v) identify a subset of the variables that have the highest scores, (vi) identify a subset of GUI elements that correspond to the subset of the variables, (vii) generate a GUI instance utilizing the subset of GUI elements, and/or (viii) output the GUI instance to one or more analysis resources.

Fewer or more components 102a-n, 106, 110, 140 and/or various configurations of the depicted components 102a-n, 106, 110, 140 may be included in the system 100 without deviating from the scope of embodiments described herein. In some embodiments, the components 102a-n, 106, 110, 140 may be similar in configuration and/or functionality to similarly named and/or numbered components as described herein. In some embodiments, the system 100 (and/or portion thereof) may comprise an AI-based GUI generation system, and/or platform programmed and/or otherwise configured to execute, conduct, and/or facilitate the method 300 of FIG. 3A and FIG. 3B herein, and/or portions thereof.

According to some embodiments, the resource devices 102a-n may comprise any type or configuration of computing, mobile electronic, network, user, and/or communication devices that are or become known or practicable. The resource devices 102a-n may, for example, comprise one or more Personal Computer (PC) devices, computer workstations, tablet computers, such as an iPad® manufactured by Apple®, Inc. of Cupertino, Calif., and/or cellular and/or wireless telephones, such as an iPhone® (also manufactured by Apple®, Inc.) or an LG V50 THINQ™ 5G smart phone manufactured by LG® Electronics, Inc. of San Diego, Calif., and running the Android® operating system from Google®, Inc. of Mountain View, Calif. In some embodiments, the resource devices 102a-n may comprise one or more devices owned and/or operated by one or more users (not shown), such as analysts and/or electronic product (e.g., underwriting product) estimation, sales, and/or underwriting personnel. According to some embodiments, the resource devices 102a-n may communicate with the AI server 110 either directly or via the network 104 to provide account and/or object data, provide analysis resource data, to obtain assessment analysis results, to obtain a ranking and/or grouping of assessment results for a plurality of projects/accounts/objects, and/or obtain and/or generate a dynamically AI-customized GUI, in accordance with the AI ML-based GUI generation as described herein.

The network 104 may, according to some embodiments, comprise a Local Area Network (LAN; wireless and/or wired), cellular telephone, Bluetooth®, Near Field Communication (NFC), and/or Radio Frequency (RF) network with communication links between the AI server 110, the resource devices 102a-n, the third-party device 106, and/or the memory device 140. In some embodiments, the network 104 may comprise direct communication links between any or all of the components 102a-n, 106, 110, 140 of the system 100. The resource devices 102a-n may, for example, be directly interfaced or connected to one or more of the AI server 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The AI server 110 may, for example, be connected to one or more of the resource devices 102a-n via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110, 140 of the system 100. The network 104 may comprise one or more cellular telephone networks with communication links between the third-party device 106 and the AI server 110, for example, and/or may comprise an NFC or other short-range wireless communication path, with communication links between various resource devices 102a-n, for example.

According to some embodiments, the third-party device 106 may comprise any type or configuration of a computerized processing device, such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the resource devices 102a-n or the AI server 110; such as a certificate, authentication, and/or cryptographic service provider, and/or a satellite and/or other imagery and/or data provider). The third-party device 106 may, for example, comprise an imagery service and/or database repository that provides imagery and/or map data for processing by the AI server 110. In some embodiments, the third-party device 106 may provide and/or transmit underwriting product policy data, asset and/or object data (e.g., building data from municipal records), imagery and/or imagery analysis results data, underwriting product claim and/or loss data, etc. to the AI server 110 and/or the resource devices 102a-n. According to some embodiments, the third-party device 106 may comprise a plurality of devices (e.g., sensors and/or computing devices) and/or may be associated with a plurality of third-party entities. In some embodiments, the third-party device 106 may comprise the memory device 140 (or a portion thereof), such as in the case the third-party device 106 comprises a third-party data storage service, device, and/or system, such as the Amazon® Simple Storage Service (Amazon® S3™) available from Amazon.com, Inc. of Seattle, Wash. or an open-source third-party database service, such as MongoDB™ available from MongoDB, Inc. of New York, N.Y.

In some embodiments, the AI server 110 may comprise an electronic and/or computerized controller device, such as a computer server and/or server cluster communicatively coupled to interface with the resource devices 102a-n and/or the third-party device 106 (directly and/or indirectly). The AI server 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the AI server 110 may be located remotely from one or more of the resource devices 102a-n and/or the third-party device 106. The AI server 110 may also or alternatively comprise a plurality of electronic processing devices located at one or more various sites and/or locations (e.g., a distributed computing and/or processing network).

According to some embodiments, the AI server 110 may store and/or execute specially programmed instructions (not separately shown in FIG. 1) to operate in accordance with embodiments described herein. The AI server 110 may, for example, execute one or more programs, modules, and/or routines (e.g., AI and/or ML code and/or logic) that facilitate the analysis of assessment objects and the dynamic and AI-customized generation of GUI instances, as described herein. According to some embodiments, the AI server 110 may execute stored instructions, logic, and/or software modules to (i) identify and/or select an ML training data set, (ii) train one or more AI ML models based on the training data set(s), (iii) utilize the AI ML model to analyze a plurality of assessment projects, (iv) score each variable utilized to conduct each assessment (e.g., based on a statistical measure of the relative significance of each variable), (v) identify a subset of the variables that have the highest scores, (vi) identify a subset of GUI elements that correspond to the subset of the variables, (vii) generate a GUI instance utilizing the subset of GUI elements, and/or (viii) output the GUI instance to one or more analysis resources.

In some embodiments, the resource devices 102a-n, the third-party device 106, and/or the AI server 110 may be in communication with and/or comprise the memory device 140. The memory device 140 may comprise, for example, various databases and/or data storage mediums that may store, for example, asset and/or object data, account data, image data, variable data, statistical data, object identification rules, object data, analysis resource data, resource allocation rules, GUI element data, natural text generation data, cryptographic keys and/or data, login and/or identity credentials, and/or instructions (e.g., AI-based analysis and/or GUI assembly and/or generation instructions) that cause various devices (e.g., the AI server 110, the third-party device 106, and/or the resource devices 102a-n) to operate in accordance with embodiments described herein.

The memory device 140 may store, for example, various AI and/or ML code and/or mobile device applications and/or interface generation instructions, each of which may, when executed, participate in and/or cause AI-based analysis and/or GUI assembly and/or generation, as described herein. In some embodiments, the memory device 140 may comprise any type, configuration, and/or quantity of data storage devices that are or become known or practicable. The memory device 140 may, for example, comprise an array of optical and/or solid-state hard drives configured to store digital image and/or video data, image and/or object analysis data, unstructured data, and/or AI ML data (e.g., analysis formulas and/or mathematical models), credentialing instructions and/or keys, and/or various operating instructions, drivers, etc. In some embodiments, the memory device 140 may comprise a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form-factors, such as original, mini, and micro sizes, such as are available from Western Digital Corporation of San Jose, Calif. While the memory device 140 is depicted as a stand-alone component of the AI server 110, the memory device 140 may comprise multiple components. In some embodiments, a multi-component memory device 140 may be distributed across various devices and/or may comprise remotely dispersed components. Any or all of the resource devices 102a-n, the third-party device 106, and/or the AI server 110 may comprise the memory device 140 or a portion thereof, for example.

Figure 2:
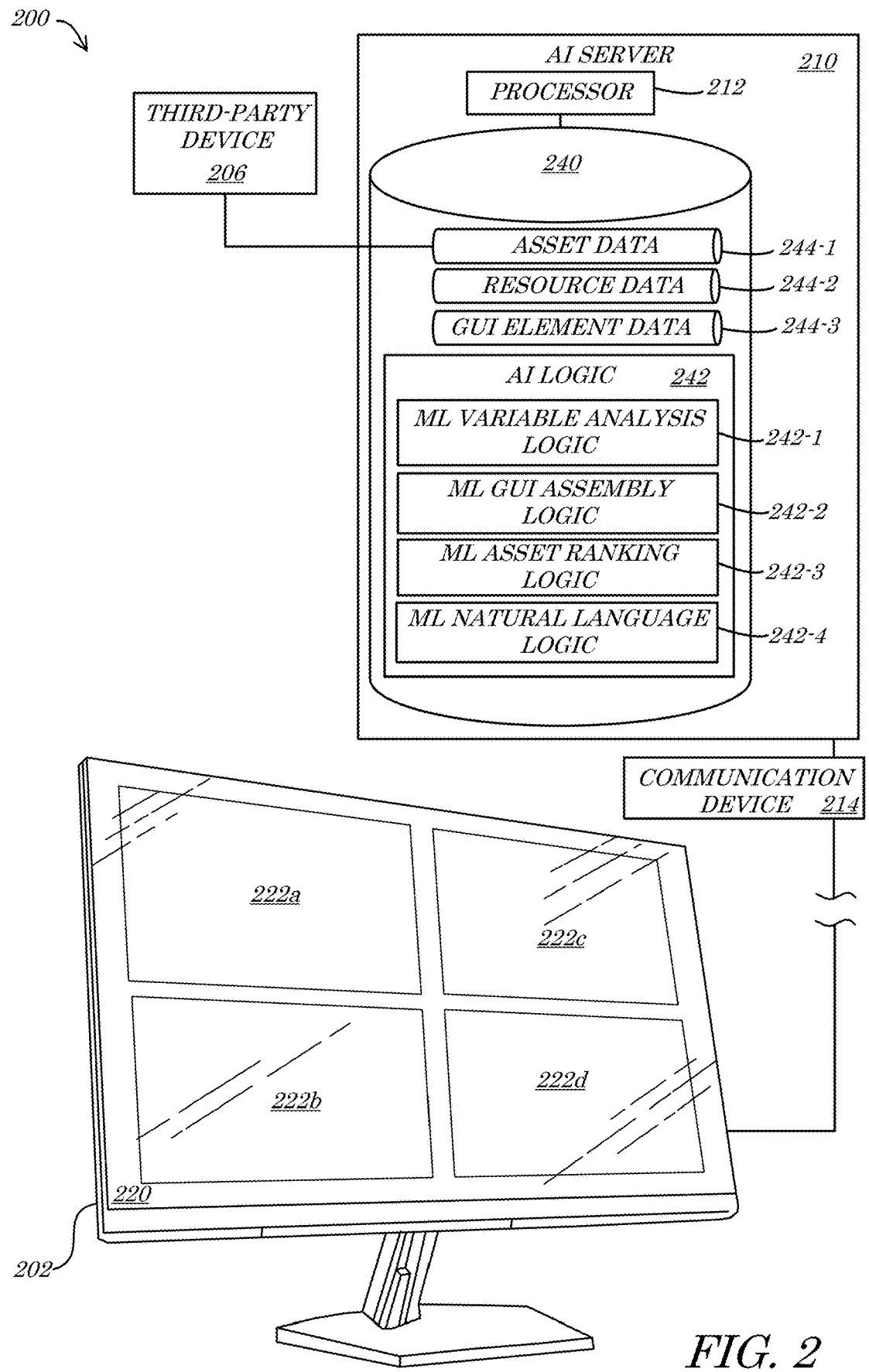
FIG. 2 is a diagram of a system according to some embodiments.

Turning now to FIG. 2, a diagram of a system 200 according to some embodiments is shown. In some embodiments, the system 200 may comprise a user or resource device 202 and/or a third-party device 206 in communication with an AI server 210. According to some embodiments, the AI server 210 may be remote from any or all of the other components 202, 206 and may be communicatively coupled therewith via various networks, wires, and/or transmission devices (not shown in FIG. 2) as are or become known or practicable. In some embodiments, the AI server 210 may comprise a centralized server or other computing device comprising one or more processors 212 and/or may be in communication with the resource device 202. The AI server 210 and/or the one or more processors 212 thereof may, for example, cause an interface 220 to be output via the resource device 202. In some embodiments, the interface 220 may comprise a plurality of GUI elements 222a-d defined and/or selected by the AI server 210. According to some embodiments, the AI server 210 may be in communication with a memory device 240. The memory device 240 may, in some embodiments, store various programs, instructions, and/or logic, such as AI logic 242, that may be executed by the processor 212 to cause the AI server 210 to operate in accordance with embodiments herein.

According to some embodiments, the AI logic 242 may comprise various rules sets and/or modules, such as ML variable analysis logic 242-1, ML GUI assembly logic 242-2, ML asset ranking logic 242-3, and/or ML natural language logic 242-4. According to some embodiments, the ML variable analysis logic 242-1 may comprise a first set of coded rules operable to (e.g., upon execution by the processor 212) identify, sort, range, analyze, and/or otherwise electronically process a plurality of data elements or sets, variables, etc., that are stored in association with a particular asset or object. The ML variable analysis logic 242-1 may, for example, analyze more than twenty (20) data elements, including one or more unstructured data elements (such as freeform text fields), to compute statistical metrics, rankings, and/or scores for each element. In some embodiments, the ML GUI assembly logic 242-2 may comprise a second set of coded rules operable to (e.g., upon execution by the processor 212) identify, based on a subset of the data elements/variables, a subset of GUI elements and utilize the identified GUI elements to assemble and/or define a GUI instance. The ML GUI assembly logic 242-2 may, for example, dynamically piece together a plurality of GUI elements selectively chosen from a larger set of available GUI elements based on statistical metrics computed with respect to the data elements/variables for the particular asset/object. In such a manner, for example, a GUI instance may be dynamically and automatically customized by the ML GUI assembly logic 242-2 based on a subset of the variables/data elements that have exceeded certain thresholds for each particular asset/object. According to some embodiments, the ML asset ranking logic 242-3 may comprise a third set of coded rules operable to (e.g., upon execution by the processor 212) sort, rank, and/or score assessment results for a plurality of assessment projects/ assets/objects. In some embodiments, the ML natural language logic 242-4 may comprise a fourth set of coded rules operable to (e.g., upon execution by the processor 212) automatically build and/or generate a natural language data element based upon an assessment result computed for a particular asset/object/project.

In some embodiments, the memory device 240 may store asset data 244-1, e.g., received from one or more of the resource device 202 and/or the third-party device 206, descriptive of one or more assets and/or objects that are the subjects of an assessment project. The asset data 244-1 may comprise, for example, data descriptive of a geographic location of an asset/object, a type of asset/object, a monetary value (e.g., market cost or replacement cost) of an asset/object, and/or data descriptive of various characteristics, attributes, and/or historic events associated with the asset/object. According to some embodiments, the memory device 240 may store resource data 244-2, e.g., received from one or more of the resource device 202 and/or the third-party device 206, descriptive of a pool of available analysis resources, such as data analysts, product underwriters, claim handlers, technicians, and/or other response personnel and/or assets (e.g., equipment, vehicles, supplies, etc.). The resource data 244-2 may comprise, for example, data descriptive of various qualities, characteristics, and/or attributes of any given resource, such as a current location, transportation abilities, skills, ratings, training levels, experience levels, statistical metrics (e.g., previous success rates, speed of resolution, etc.), and/or availability (e.g., schedule data). According to some embodiments, the memory device 240 may store GUI element data 244-3, defining various attributes, characteristics, and/or technical requirements (e.g., network address location identifiers, functional program code calls, subroutine calls, etc.) for a plurality of GUI elements. The GUI element data 244-3 may comprise, for example, definitions of GUI element graphical properties, such as colors, sizes, shapes, images, video, sounds, behavior characteristics, such as mouse-over and/or on-click event reaction data, layout data and/or behaviors, data field characteristics, etc.

In some embodiments, the AI server 210 may request that either or both of the resource device 202 and the third-party device 206 capture and/or provide data descriptive of one or more objects, accounts, and/or assets. The resource device 202 and/or the third-party device 206 may capture and/or provide, for example, data stored in and/or comprising one or more of the asset data 244-1 and/or the resource data 244-2. According to some embodiments, the received data may be processed by the processor 212 by an execution of the AI logic 242 stored in the memory device 240. The ML variable analysis logic 242-1, ML GUI assembly logic 242-2, ML asset ranking logic 242-3, and/or ML natural language logic 242-4 may, for example, comprise various specially programmed rules and logic, such as one or more trained ML models and/or modules that may be executed to automatically derive and/or compute assessment variable relevance or weight and automatically construct and/or generate a GUI instance with GUI elements selected based on the computed weights/relevancies. The AI server 210 may determine, based on asset/object/account data, for example, that four (4) variables and/or data elements descriptive of the asset/object/account rank the highest (i.e., the four (4) variables with the highest scores and/or metric values) out of all relevant and/or analyzed variables and that such variables correspond to (e.g., based on data association links that are predefined and stored in the memory device 240—although not separately depicted) four (4) distinct GUI elements 222a-d from a group of many available GUI elements. The AI server 210 may utilize the identified/selected GUI elements 222a-d (e.g., a subset of all available GUI elements; e.g., from the GUI element data 244-3), in some embodiments, to generate an AI-customized GUI instance that is output via the resource device 202 (e.g., as the interface 220).

According to some embodiments, the ML variable analysis logic 242-1 may process the asset data 244-1 to identify the subset of variables/data elements that meet a threshold and/or statistical criteria (as described herein), such as the hypothetical four (4) data elements noted above. The four (4) variables and/or data elements may comprise one or more of: (i) variable values, (ii) computed variable values, and/or (iii) freeform and/or unstructured data values. In some embodiments, each of the hypothetical four (4) data elements may be mapped (e.g., utilizing stored data relationships from the memory device 240 as processed by the ML GUI assembly logic 242-2) to one (or more) of the GUI elements 222a-d. For example, a first data element may correspond (e.g., link) to a first GUI element 222a, a second data element may correspond (e.g., link) to a second GUI element 222b, a third data element may correspond (e.g., link) to a third GUI element 222c, and/or a fourth data element may correspond (e.g., link) to a fourth GUI element 222d. In some embodiments, the ML GUI assembly logic 242-2 may define an arrangement (e.g., positioning, sizing, and/or behaviors) of the GUI elements 222a-d on the interface 220 (and/or defining the interface 220). The first data element (such as a value for an age of a roof variable for a building object being assessed—e.g., as stored in the asset data 244-1) may comprise a highest-ranking data element or variable (based on a statistical metric and/or threshold evaluation, as described herein), for example, and the corresponding first GUI element 222a may accordingly be positioned in a first position (e.g., an upper left position) in the interface 220 (and/or sized as a first size, assigned a first shape, color, etc.). One or more of the positions, sizes, shapes, colors, etc., of the other GUI elements 222b-d may differ from the first GUI element 222a based on the respective and/or relative rankings, scores, etc., of the underlying data elements/variables to which they correspond. In such a manner, for example, variables and/or data elements being evaluated as having more substantial effects on assessment scores and/or results for an asset/object/account may not only be selectively output via the interface 220, but may also be selectively and dynamically sized, positioned, and/or configured based on their computed relevance levels.

Fewer or more components 202, 206, 210, 212, 220, 222a-d, 240, 242, 242-1, 242-2, 242-3, 242-4, 244-1, 244-2, 244-3, and/or various configurations of the depicted components 202, 206, 210, 212, 220, 222a-d, 240, 242, 242-1, 242-2, 242-3, 242-4, 244-1, 244-2, 244-3 may be included in the system 200 without deviating from the scope of embodiments described herein. In some embodiments, the components 202, 206, 210, 212, 220, 222a-d, 240, 242, 242-1, 242-2, 242-3, 242-4, 244-1, 244-2, 244-3 may be similar in configuration and/or functionality to similarly named and/or numbered components as described herein. In some embodiments, the system 200 (and/or one or more portions thereof) may comprise an AI-based GUI generation system, and/or platform programmed and/or otherwise configured to execute, conduct, and/or facilitate the method 300 of FIG. 3A and FIG. 3B herein, and/or portions thereof.

III. AI GUI Generation Methods

Figure 3A:
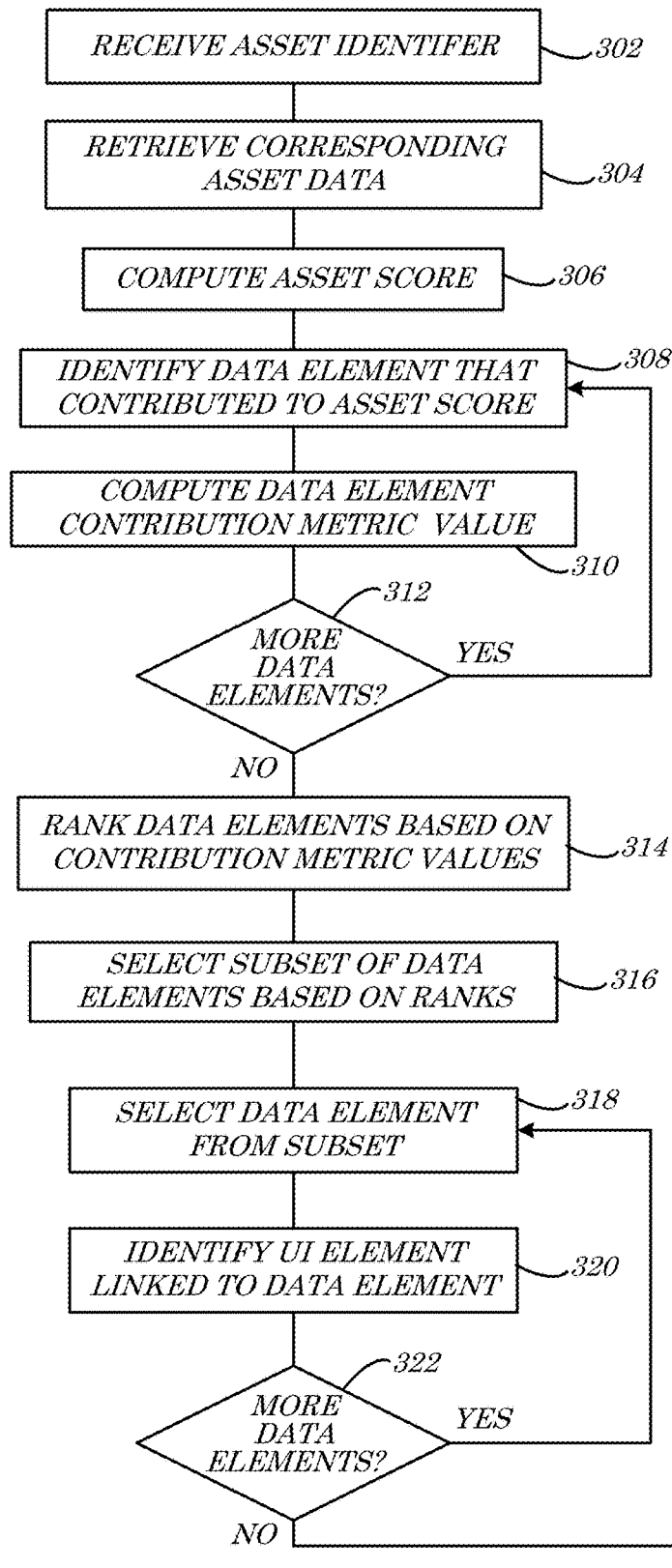
FIG. 3A and FIG. 3B are flow diagrams of a method according to some embodiments.
Figure 3B:
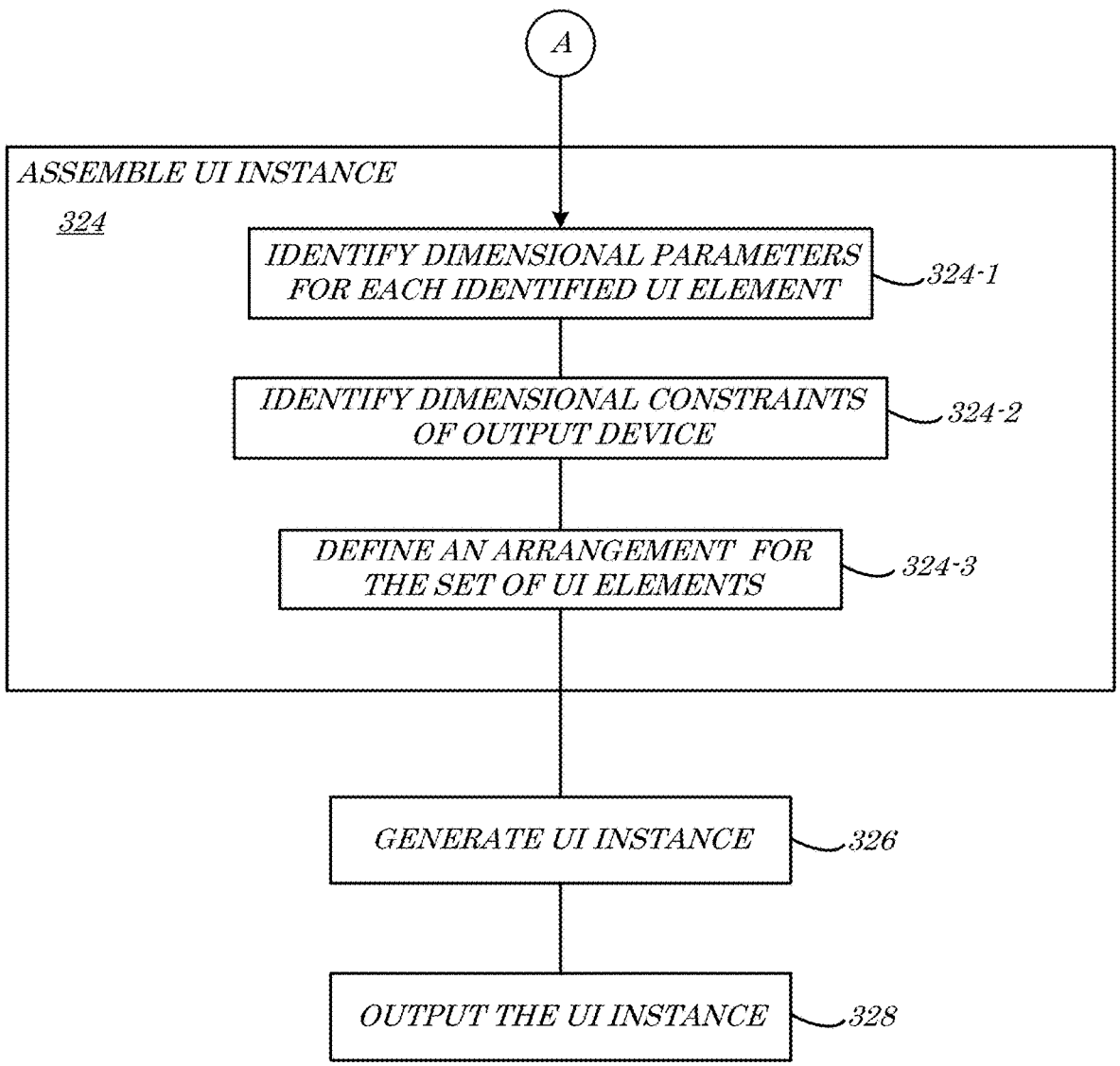

Referring now to FIG. 3A and FIG. 3B, flow diagrams of a method 300 according to some embodiments are shown. In some embodiments, the method 300 may be performed and/or implemented by and/or otherwise associated with one or more specialized and/or specially-programmed computers (e.g., the resource devices 102*a-n*, 202, the third-party devices 106, 206, and/or the AI servers/apparatus 110, 210, 810 of FIG. 1, FIG. 2, and/or FIG. 8 herein), computer terminals, computer servers, computer systems and/or networks, and/or any combinations thereof (e.g., by one or more underwriting analysis workstations and/or mobile devices). In some embodiments, the method 300 may cause an electronic device, such as one of the resource devices 102*a-n*, 202 and/or the AI servers/apparatus 110, 210, 810 of FIG. 1, FIG. 2, and/or FIG. 8 to perform certain steps and/or commands and/or may cause an outputting and/or management of input/output data via one or more graphical and/or user interfaces, such as the interface 220, 520, 620, 720, 820 of FIG. 5, FIG. 6, FIG. 7, and/or FIG. 8 herein.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage/memory devices and/or structures 140, 240, 440, 840, 940*a-e* of FIG. 1, FIG. 2, FIG. 4, FIG. 8, FIG. 9A, FIG. 9B, FIG. 9C, FIG. 9D, and/or FIG. 9E herein) may store thereon instructions that when executed by a machine (such as a computerized processor) result in performance according to any one or more of the embodiments described herein.

According to some embodiments, the method 300 may comprise various functional modules, routines, and/or procedures, such as a plurality of AI-based and/or ML algorithm and/or model executions. In some embodiments, the method 300 may comprise receiving (e.g., by an electronic processing device and/or from a remote image capture, sensor, and/or other data device) asset identification information, at 302. The asset identification information may comprise, for example, one or more data strings, images, and/or other sensor data descriptive of the asset/object, an account, an entity, and/or a location. The asset identification information may comprise, in some embodiments, satellite or aerial imagery of a location, such as a town or other geographic area. According to some embodiments, satellite and/or aerial imagery may be received and/or acquired from a third-party source, such as a map server, e.g., the United States Geological Survey (USGS) of Reston, Va. In some embodiments, the asset identification information may comprise images, video, and/or other data acquired or captured by a user device operated by a customer, client, policy holder, and/or other user at or near a particular geographic location. Such image data may comprise, for example, cellphone photos captured by a smartphone of the user and being descriptive of an object at the user's location. The user may capture images of an insured vehicle, home, business, and/or other structure or object, for example, and transmit the images to a centralized AI device, such as a web server in communication with an application executed by the mobile device. According to some embodiments, the asset identification information may be received at various points in time and/or may be descriptive of the location at various points in time. Overhead images and/or object images may be received, for example, both before and after an event, such as a storm.

According to some embodiments, the method 300 may comprise retrieving (e.g., by the electronic processing device executing a data access algorithm) asset data corresponding to the asset identification information, at 304. An AI-based assessment system and/or server may, for example, utilize one or more portions of the asset identification information as a key and/or query definition passed to a database and/or database server or controller. Any or all asset identification information may be stored in one or more databases in relation to the asset data, for example, and the asset data may accordingly be identified and/or retrieved/accessed based on the asset identification information and the stored data links therebetween. In some embodiments, different portions of the asset identification information may be utilized to retrieve different portions of the asset data from different sources. A first portion of the asset identification information may be passed (e.g., transmitted) to a first database, for example, and a second portion of the asset identification information may be passed (e.g., transmitted) to a second database. According to some embodiments, the databases may respond to the queries by providing first and second portions of the asset data, respectively.

In some embodiments, the method 300 may comprise computing (e.g., by the electronic processing device executing an AI assessment algorithm) an asset score, at 306. The asset data (or a subset thereof) may be analyzed, for example, to calculate or compute one or more quantitative and/or qualitative metric values for the asset/object/account. The AI system may execute stored logical rules, routines, and/or procedures, in some embodiments, to assess the asset/object/account. In some embodiments, such as in the case that multiple variables and/or data elements from the asset data (and/or elsewhere) are utilized by the AI logic, a plurality of scores and/or metric values may be mathematically summed, averaged, weighted, and/or otherwise processed to define an overall asset score for the asset/object/account. According to some embodiments, the asset score may be calculated by an ML model that utilizes a plurality of asset/object/account inputs (e.g., the asset data), such as underwriting product policy details (e.g., policy age, product category, underwriting tier), property details (e.g., in the case that the asset comprises real property; e.g., roof age, property age, roof material), claim data (e.g., in the case that one or more claims of loss are associated with the asset/object/account; e.g., claim payout amount, primary Cause of Loss (CoL), number of claims), and/or metadata (e.g., referral reasons, Notice of Loss (NoL) delay, multiple policies/accounts).

According to some embodiments, the method 300 may comprise identifying (e.g., by the electronic processing device) a data element that contributed to the asset score, at 308. The AI system may, for example, cycle through a listing of all variables and/or data elements (e.g., fields, values, and/or parameters) that were utilized as inputs in the computation of the asset score. In some embodiments, the system may randomly select a first one of the variables/data elements or may utilize a process or routine to otherwise sequentially identify any or all relevant variables/data elements. According to some embodiments, an identifier of the first one of the identified data elements may be retrieved.

In some embodiments, the method 300 may comprise computing (e.g., by the electronic processing device executing a statistical analysis algorithm) a data element contribution metric value, at 310. The identified first one of the variables/data elements (e.g., an independent variable) may be evaluated, for example, to compute and/or calculate a data element contribution metric value descriptive of a contribution of the identified first one of the variables/data elements to the asset score. In some embodiments, statistical evaluation may be utilized to mathematically evaluate and/or quantify the statistical and/or mathematical significance of the identified first one of the variables/data elements. According to some embodiments, various regression factors, such as a linear regression "$R^2$-value", may be utilized as a measure of the magnitude of the effect of the identified first one of the variables/data elements on the asset score. Various statistical and/or modeling variables may be utilized to model and/or derive a measure of contribution, weight, and/or significance, e.g., utilizing null hypothesis significance testing and a resulting "p-value" and/or "F-test" or "F-score" for the identified first one of the variables/data elements. According to some embodiments, one or more scores, factors, and/or values may be standardized and utilized as the data element contribution metric. In some embodiments, a model may be executed that quantifies a change in the asset score (and/or an $R^2$-value) before and after utilization of the identified first one of the variables/data elements. In such a manner, for example, a magnitude in the change in the asset score due to the identified first one of the variables/data elements may be quantified. In some embodiments, the data element contribution metric value may comprise a plurality of scores and/or values for the identified first one of the variables/data elements.

According to some embodiments, the method 300 may comprise determining (e.g., by the electronic processing device) whether there are additional data elements to analyze, at 312. The method 300 may, for example, analyze the asset score and/or the computational process thereof to identify one or more additional data elements/variables that were utilized in computing and/or calculating the asset score (e.g., and that have not yet been scored or evaluated for contributory value). In the case that one or more additional data elements/variables are identified, the method 300 may proceed back to identifying the particular one or more additional data elements/variables at 308. In the case that no additional data elements/variables are determined to exist (e.g., that have not already been analyzed), the method 300 may proceed to ranking the data elements based on their respective data element contribution metric values, at 314. The particular statistical relevance/contribution metric values for each analyzed/scored data element/variable may be mathematically ranked, for example, to define a ranked listing of data elements/variables that were utilized to compute the asset score. The ranked listing may be sorted in either ascending or descending numeric value order, depending upon the nature of the statistical data element contribution metric utilized. In the case that the data element contribution metric value comprises a plurality of scores and/or values, a separate listing for each scoring/value metric may be computed.

In some embodiments, the method 300 may comprise selecting (e.g., by the electronic processing device executing a statistical analysis algorithm) a subset of the data elements based on the ranking, at 316. A threshold number (e.g., a fixed number or a percentage of the total) of the variables/data elements may be selected from the ranked listing, for example, thereby defining a subset listing that includes the highest ranked data elements/variables. The threshold may comprise a relative threshold, such as a fixed number or percent of all variables/data elements, or may comprise a dynamic threshold, such as a threshold defining a minimum or maximum data element contribution metric value. In the case that the data element contribution metric value comprises a plurality of scores and/or values and the ranked listing comprises a plurality of respective listings, a separate subset for each scoring/value metric may be computed or the separate rankings may be compared and/or evaluated to select the subset based on the plurality of rankings.

According to some embodiments, the method 300 may comprise selecting (e.g., by the electronic processing device executing a statistical analysis algorithm) one of the subset of data elements, at 318. The AI system may, for example, cycle through a listing of all variables and/or data elements (e.g., fields, values, and/or parameters) of the selected subset(s). In some embodiments, the system may randomly select a first one of the variables/data elements from the subset or may utilize a process or routine to otherwise sequentially identify any or all relevant variables/data elements of the subset. According to some embodiments, an identifier of the first one of the identified data elements of the subset may be retrieved.

In some embodiments, the method 300 may comprise identifying (e.g., by the electronic processing device executing the data access algorithm) a UI element linked to the selected data element, at 320. The AI-based assessment system and/or server may, for example, utilize data descriptive of the selected first one of the identified data elements of the subset (e.g., a variable and/or data element identifier) as a key and/or query definition passed to a database and/or database server or controller. Data element/variable information may be stored in one or more databases in relation to one or more UI elements, for example, and the UI element (and/or data descriptive thereof) may accordingly be identified and/or retrieved/accessed based on the information descriptive of the first one of the identified data elements of the subset, and the stored data links therebetween. In some embodiments, the information descriptive of the first one of the identified data elements of the subset may be utilized to retrieve different portions, versions, instances, and/or components of the UI element from different sources. Data descriptive of and/or identifying the first one of the identified data elements of the subset may be passed (e.g., transmitted) to a first database, for example, and to a second database. According to some embodiments, the databases may respond to the queries by providing first and second data portions defining the UI element, respectively.

According to some embodiments, the method 300 may comprise determining (e.g., by the electronic processing device) whether there are additional data elements/variables from the subset to analyze, at 322. The method 300 may, for example, cycle through the subset of data elements to identify one or more additional data elements/variables from the subset that have not yet been mapped to a respective UI element(s). In the case that one or more additional data elements/variables from the subset are identified, the method 300 may proceed back to selecting the particular one or more additional data elements/variables of the subset at 318. In the case that no additional data elements/variables of the subset are determined to exist (e.g., that have not already been mapped), the method 300 may proceed to assembling a UI instance, at 324.

In some embodiments, the method 300 and/or the UI assembly at 324 may comprise identifying (e.g., by the electronic processing device executing an AI UI assembly algorithm) dimensional parameters for each identified UI element, at 324-1. Various dimensional parameters, such as height, width, thickness, length, depth (e.g., for three-dimensional UI elements), and/or other parameters and/or characteristics, such as alternate dimensions (e.g., collapsed or expanded), colors, animations, links, and/or embedded code, may be retrieved from a data store descriptive of each UI element (e.g., a UI element library). According to some embodiments, the sum and/or other mathematical result (e.g., maximum and/or minimum) of dimensional values for the various UI elements and/or groupings of UI elements may be calculated. In some embodiments, various layouts and/or arrangements of the identified UI elements (e.g., identified from a larger set or plurality of available or possible UI elements) may be identified and/or evaluated for overall (e.g., aggregated) dimensional characteristics (e.g., total width and/or height).

According to some embodiments, the method 300 and/or the UI assembly at 324 may comprise identifying (e.g., by the electronic processing device executing the AI UI assembly algorithm) dimensional constraints of an output device, at 324-2. One or more output devices via which a GUI may be output may be identified, for example, and screen resolution and/or other display characteristics may be retrieved and/or computed. According to some embodiments, such as in the case that an analyst/user device is in communication with the AI server, the system may request and/or retrieve display characteristics and/or parameters from the user device. In some embodiments, such characteristics (e.g., screen resolution, dimensions, etc.) may be looked up by utilizing a make, model, and/or Media Access Control (MAC) address as a query key to one or more data stores (e.g., a third-party data store, such as a screen specifications data provider).

In some embodiments, the method 300 and/or the UI assembly at 324 may comprise defining (e.g., by the electronic processing device executing the AI UI assembly algorithm) an arrangement for the set of UI elements, at 324-3. The set of possible arrangements based on the dimensional parameters of the UI elements (singularly or in combinations) may be evaluated with respect to (e.g. compared to) the dimensional constraints of the output device, for example, such that the identified UI elements (e.g., corresponding to the subset of highest-ranked data elements/variables) fit within the available space. In cases where the constraints of the output device comprise rectangular screen resolution and/or dimension maximums, the AI system may iteratively attempt to match various possible UI element arrangements and/or orientations within the permitted rectangular space. According to some embodiments, the output constraints may include more complex geometric constraints, such as certain areas of the display in which no UI element may be placed (e.g., a location of an existing and/or different UI element). In some embodiments, the AI system may compute various arrangements that work within the given constraints and may select one such arrangement as the desired arrangement for the UI elements to form a UI instance. In some embodiments, the arrangement may be recalculated and/or analyzed in the case that the screen/output constraints are altered. A first instance of a UI interface in accordance with a first arrangement of the UI elements may be derived at a first time based on first output device constraints, for example, and a second instance of the UI interface in accordance with a second arrangement of the UI elements may be derived at a second time based on second output device constraints.

According to some embodiments, the method 300 may comprise generating (e.g., by the electronic processing device) the UI instance, at 326. Once an arrangement of the UI elements has been selected, chosen, and/or computed, for example, rules for assembling the UI elements may be utilized to generate a UI instance in accordance with the arrangement. In some embodiments, each UI element may be generated, reproduced, emulated, and/or constructed at a location in accordance with the arrangement. The generation may comprise, for example, defining a listing of coordinate and/or location values assigned to each UI element. In some embodiments, the generation may comprise transmitting one or more signals to an electronic processing device, Graphics Processing Unit (GPU), and/or communications device/transceiver. According to some embodiments, the generation may comprise creating one or more electronic files defining the arrangement and/or the UI elements, such as a GUI instance package, program, and/or application.

In some embodiments, the method 300 may comprise outputting the UI instance, at 328. In the case that the AI GUI generation is conducted and/or managed through a mobile device application, for example, the mobile device application may cause the set of UI elements (e.g., in their respective positions) to be displayed via a display device and/or interface of the device. According to some embodiments, an AI device, such as a centralized or remote server, may send a signal to the remote device defining an interface instance and/or causing the device to output an interface that includes objects in accordance with the selected arrangement of UI elements. In such a manner, for example, an assessment analysis resource employee or agent may readily view, edit, and/or otherwise utilize the dynamically and asset/object/account-specific GUI instance to evaluate, rate, score, rank, approve, reject, and/or otherwise provide input and/or make decisions regarding one or more AI-based assessments.

IV. AI GUI Generation Data Structures

Referring to FIG. 4, a diagram of an example data storage structure 440 according to some embodiments is shown. In some embodiments, the data storage structure 440 may comprise a plurality of data tables, such as an asset table 444a, an assessment table 444b, and/or a UI element table 444c. The data tables 444a-c may, for example, be utilized to store, modify, update, retrieve, and/or access various information related to various assets, objects, underwriting product accounts, analysis resources, sensor data, third-party data, imagery, customers (or other users), and/or UI assembly and/or generation elements, components, etc. The data tables 444a-c may be utilized in accordance with some embodiments, to conduct AI-based UI and/or GUI generation and/or dissemination by: (i) identifying and/or selecting an ML training data set, (ii) training one or more AI ML models based on the training data set(s), (iii) utilizing the AI ML model to analyze a plurality of assessment projects, (iv) scoring each variable/data element utilized to conduct each assessment (e.g., based on a statistical measure of the relative significance of each variable/data element), (v) identifying a subset of the variables/data elements that have the highest scores, (vi) identifying a subset of UI/GUI elements that correspond to the subset of the variables/data elements, (vii) generating a UI/GUI instance utilizing the subset of UI/GUI elements, and/or (viii) outputting the UI/GUI instance to one or more analysis resources.

The asset table 444a may comprise, in accordance with some embodiments, an asset IDentifier (ID) field 444a-1, a type field 444a-2, a roof age 444a-3, a location field 444a-4, a class field 444a-5, and/or a narrative field 444a-6. The asset ID field 444a-1 may store any type of identifier that is or becomes desirable or practicable (e.g., a unique identifier, an alphanumeric identifier, and/or an encoded identifier). As an example of how the example data structure 440 may be utilized in accordance with some embodiments, the asset table 444a may store information relating particular assets, objects, and/or accounts (e.g., identified by unique identifiers and/or codes stored in the asset ID field 444a-1) to asset/object/account characteristics and/or attributes. The type field 444a-2 may store, for example, data descriptive of a type of asset/object/account (such as a structure, home, automobile, vehicle, business) and/or the roof age 444a-3 may store data descriptive of an age (and/or type, material, construction method, etc.) for a roof (e.g., in the case that the type comprises a structure having a roof). According to some embodiments, the location field 444a-4 may store data descriptive of a current location of (or assigned to) each asset/object/account, such as a street name, address, postal code, state, country, coordinates, particular building, and/or particular business. The location field 444a-4 may store, for example, any location identifying data that is or becomes known or practicable, such as GPS coordinates, postal addresses, latitude and longitude coordinates, and/or a unique or proprietary certified location identifier. In some embodiments, the class field 444a-5 may store data descriptive of a result of a formula, calculation, and/or logical evaluation result, such as a Standard Industrial Classification (SIC) code and/or other metric and/or the schedule narrative field 444a-6 may store unstructured and/or freeform data, such as a freeform narrative text description of the asset/object/account.

The assessment table 444b may comprise, in accordance with some embodiments, an assessment ID field 444b-1, a score field 444b-2, an asset ID field 444b-3, a variable ID field 444b-4, and/or a variable score field 444b-5. The assessment ID field 444b-1 may store, for example, a unique identifier for a particular assessment for a particular asset, object, and/or account. According to some embodiments, the score field 444b-2 may store one or more values descriptive of a result of the assessment, such as a score or other value. According to some embodiments, the score field 444b-2 may store a numeric value representative of a cumulative, total, or average underwriting score for the asset/object/account. In some embodiments, the asset ID field 444b-3 may store an identifier that links to information descriptive of a particular asset, object, and/or account. According to some embodiments, the variable ID field 444b-4 may store an identifier that links to information descriptive of a particular variable and/or data element associated with (e.g., utilized in) the assessment calculations and/or computations. In some embodiments, the variable score field 444b-5 may store data descriptive of a score, rank, and/or other qualitative metric value for the particular variable (e.g., a statistical metric, such as an "R-value" or "F score", standardized regression coefficients, last R-squared value increase, etc.).

The UI element table 444c may comprise, in accordance with some embodiments, a UI element ID field 444c-1, a variable ID field 444c-2, a type field 444c-3, a horizontal (e.g., "horiz.") size field 444c-4, a vertical (e.g., "vert.") size field 444c-5, and/or a priority field 444c-6. The UI element ID field 444c-1 may store any type of identifier that is or becomes desirable or practicable (e.g., a unique identifier, an alphanumeric identifier, and/or an encoded identifier). The variable ID field 444c-2 may store an identifier that links to information descriptive of a particular variable or data element, for example, and/or the type field 444c-3 may store data descriptive of and/or defining a type of UI element (e.g., a GUI feature, object, and/or construct). According to some embodiments, the horiz. size field 444c-4 and the vert. size field 444c-5 may store information defining one or more dimensional parameters of the UI element (e.g., horizontal and vertical dimensions, e.g., in pixels in the case that a digital display screen is utilized), and/or the priority field 444c-6 may store information defining a relational order, hierarchy, and/or grouping of the UI elements.

In some embodiments, AI-based UI/GUI generation and/or output processes may be defined and/or provided by relationships established between two or more of the data tables 444a-c. As depicted in the example data storage structure 440, for example, a first relationship "A" may be established between the asset table 444a and the assessment table 444b. In some embodiments (e.g., as depicted in FIG. 4), the first relationship "A" may be defined by utilizing the asset ID field 444a-1 as a data key linking to the asset ID field 444b-3. According to some embodiments, the first relationship "A" may comprise any type of data relationship that is or becomes desirable, such as a one-to-many, many-to-many, or many-to-one relationship. In the case that multiple assessments and/or assessment variables are likely to be applicable to a certain asset/object/account, the first relationship "A" may comprise a one-to-many relationship (e.g., many variables/assessments per single asset/object/account; as depicted in the example data).

According to some embodiments, a second relationship "B" may be established between the assessment table 444b and the UI element table 444c. In some embodiments (e.g., as depicted in FIG. 4), the second relationship "B" may be defined by utilizing the variable ID field 444b-4 as a data key linking to the variable ID field 444c-2. According to some embodiments, the second relationship "B" may comprise any type of data relationship that is or becomes desirable, such as a one-to-many, many-to-many, or many-to-one relationship. In the case that multiple variables/data elements are likely to correspond to multiple UI elements, and vice versa, the second relationship "B" may comprise a many-to-many relationship (e.g., many UI elements per single variable/data element and/or many variables/data elements per single UI element; as depicted in the example data).

Utilizing the various relationships, "A" and/or "B", it may accordingly be possible to readily identify, for any particular asset, any or all corresponding UI elements. As indicated by the example data in the data storage structure 440, a first asset identified by the asset ID "CT-DH77" stored in the first data record of the asset table 444a may be a "Home" asset (e.g., based on the corresponding data stored in the type field 444a-2) located at "123 Main St." (e.g., based on the corresponding data stored in the location field 444a-4) and having a freeform text narrative stored in relation thereto (e.g., based on the corresponding data stored in the narrative field 444a-6). Utilizing the first relationship "A" and the second relationship "B" it may be determined that the first asset has an assessment (e.g., identified by assessment ID "AUG01-H7G5" as stored in the assessment ID field 444b-1) with a computed score of two thousand one hundred (2100) (e.g., as stored in the score field 444b-2) and that the assessment has (at least) four different variables and/or data elements (e.g., identified by the various variable ID values stored in the variable ID field 444b-4) that have contributed to (e.g., been utilized in the calculation of) the score.

According to some embodiments, and as depicted with respect to the non-limiting example data in the data storage structure 440, the various contributing variables may be scored and/or ranked, by calculation of a corresponding score (e.g., an "F score" and/or other statistical metric) stored in the respective row of the variable score field 444b-5. In some embodiments, variables having scores and/or ranks above a threshold (e.g., a predetermined and/or dynamically determined threshold) may be selected and/or identified for guiding and/or defining UI/GUI assembly and/or generation. Utilizing the second relationship "B", it may be possible to readily identify one or more corresponding UI elements that are linked to the selected/identified variables/data elements (e.g., a subset of all available and/or relevant variables/data elements). As indicated by the example data in the data storage structure 440, a first variable identified by the identifier "NUM-001" (e.g., based on the corresponding data stored in the variable ID field 444b-4 and the linked variable ID field 444c-2) may be linked to two (2) different UI/GUI elements—e.g., a "pick-list" element and a "radio" button element (e.g., for which descriptive data is stored in the corresponding rows of the UI element table 444c).

In some embodiments, fewer or more data fields than are shown may be associated with the data tables 444a-c. Only a portion of one or more databases and/or other data stores is necessarily shown in the data storage structure 440 of FIG. 4, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

V. AI GUI Generation Interfaces

Figure 5:
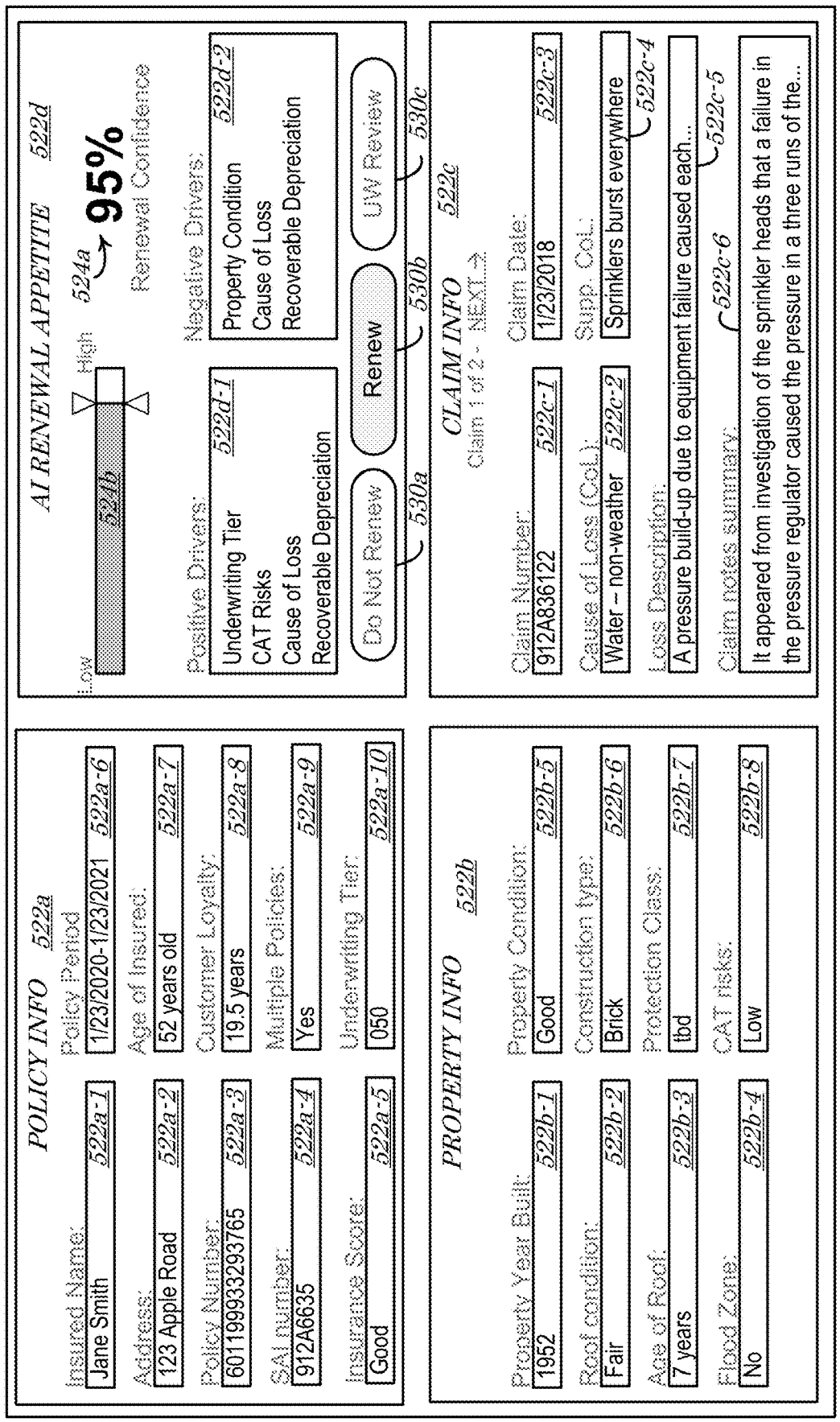
FIG. 5 is a diagram of an example interface according to some embodiments.

Turning now to FIG. 5, a diagram of an example interface 520 according to some embodiments is shown. In some embodiments, the interface 520 may comprise a web page, web form, database entry form, Application Programming Interface (API), spreadsheet, table, map interface, and/or application or other GUI via which assessment data and/or results may be provided with information defining and/or describing AI-based variable and/or data element significance, as described herein. The interface 520 may, for example, comprise a front-end of an AI-facilitated underwriting product assessment program and/or platform programmed and/or otherwise configured to execute, conduct, and/or facilitate the method 300 of FIG. 3A and FIG. 3B herein, and/or portions thereof. In some embodiments, the interface 520 may be output via a computerized device, such as the resource devices 102a-n, 202, the third-party devices 106, 206, apparatus, 810, and/or the AI servers 110, 210 of FIG. 1, FIG. 2, and/or FIG. 8 herein.

According to some embodiments, the interface 520 may comprise one or more tabs and/or other segmented and/or logical-presented data forms and/or fields. In some embodiments, the interface 520 may be configured, assembled, generated, and/or organized automatically by execution of AI logic execution as described herein. As depicted in FIG. 5 for purposes of non-limiting example, the interface 520 may comprise four (4) distinct GUI elements 522a-d defining, e.g., different output (and/or input) areas of the interface 520. In accordance with embodiments herein, each of the distinct GUI elements 522a-d (and/or the contents and/or functionality thereof) may be automatically selected by an AI routine based on an AI-based assessment of a particular object, asset, and/or account. According to some embodiments, each of a first GUI element 522a, a second GUI element 522b, and a third GUI element 522c may correspond to and/or be descriptive of one or more data elements and/or variables (and/or groupings thereof) that have been identified as being the highest ranked (e.g., the top three (3)) variables/data elements that have influenced a result for the particular assessment.

In some embodiments, the first GUI element 522a may comprise, define, and/or output, for example, any or all of: (i) an insured name field 522a-1, (ii) an address field 522a-2, (iii) a policy number field 522a-3, (iv) an SAI number field 522a-4, (v) an insurance score field 522a-5, (vi) a policy period field 522a-6, (vii) an age of insured field 522a-7, (viii) a customer loyalty field 522a-8, (ix) a multiple policies field 522a-9, and/or (x) an underwriting tier field 522a-10. According to some embodiments, each of the data fields 522a-1, 522a-2, 522a-3, 522a-4, 522a-5, 522a-6, 522a-7, 522a-8, 522a-9, 522a-10 of the first GUI element 522a may represent a different data element and/or variable that has been scored and/or ranked with respect to an assessment (e.g., having a first score and/or rank). The first GUI element 522a may comprise a listing/outputting, for example, of the top ten (10) highest ranked (e.g., based on statistical contribution metric values, as described herein) data elements. In some embodiments, the scoring and/or ranking of data elements/variables may be conducted and/or segmented into groups of variables/data elements. As each variable/data element corresponding to the data fields 522a-1, 522a-2, 522a-3, 522a-4, 522a-5, 522a-6, 522a-7, 522a-8, 522a-9, 522a-10 may belong to a group of variables/data elements categorized as "Policy Info", for example, a collective, average, and/or maximum score or ranking for the group may cause the interface 520 to include the first GUI element 522a. In such an embodiment, for example, a single data element/variable, such as a customer loyalty metric output in the customer loyalty field 522a-8, may be determined to be in a subset of highest-ranking variables/data elements that have contributed to the assessment, and the entire grouping (and/or a subset as depicted) of "Policy Info" data elements/variables may accordingly be output via the first GUI element 522a.

According to some embodiments, the second GUI element 522b may comprise, define, and/or output, for example, any or all of: (i) a property year built field 522b-1, (ii) a roof condition field 522b-2, (iii) an age of roof field 522b-3, (iv) a flood zone field 522b-4, (v) a property condition field 522b-5, (vi) a construction type field 522b-6, (vii) a protection class field 522b-7, and/or (viii) a CAT risks field 522a-8. According to some embodiments, each of the data fields 522b-1, 522b-2, 522b-3, 522b-4, 522b-5, 522b-6, 522b-7, 522b-8 of the second GUI element 522b may represent a different data element and/or variable that has been scored and/or ranked with respect to the assessment (e.g., having a second score and/or rank). The second GUI element 522b may comprise a listing/outputting, for example, of the eleventh through eighteenth ranked (e.g., based on statistical contribution metric values, as described herein) data elements (e.g., with the first through tenth ranked variables/data elements being output via the first GUI element 522a). In some embodiments, the scoring and/or ranking of data elements/variables may be conducted and/or segmented into groups of variables/data elements. As each variable/data element corresponding to the data fields 522b-1, 522b-2, 522b-3, 522b-4, 522b-5, 522b-6, 522b-7, 522b-8 may belong to a group of variables/data elements categorized as "Property Info", for example (e.g., in the non-limiting example case where the asset/account comprises real property), a collective, average, and/or maximum score or ranking for the group may cause the interface 520 to include the second GUI element 522b. In such an embodiment, for example, a single data element/variable, such as an age of roof metric output in the age of roof field 522b-3, may be determined to be in a subset of highest-ranking variables/data elements that have contributed to the assessment, and the entire grouping (and/or a subset as depicted) of "Property Info" data elements/variables may accordingly be output via the second GUI element 522b.

In some embodiments, the third GUI element 522c may comprise, define, and/or output, for example, any or all of: (i) a claim number field 522c-1, (ii) a Cause of Loss (CoL) field 522c-2, (iii) a claim date field 522c-3, (iv) a supplemental CoL field 522c-4, (v) a loss description field 522c-5, and/or (vi) a claim notes summary field 522c-6. According to some embodiments, each of the data fields 522c-1, 522c-2, 522c-3, 522c-4, 522c-5, 522c-6 of the third GUI element 522c may represent a different data element and/or variable that has been scored and/or ranked with respect to the assessment (e.g., having a third score and/or rank). The third GUI element 522c may comprise a listing/outputting, for example, of the nineteenth through twenty-fourth ranked (e.g., based on statistical contribution metric values, as described herein) data elements (e.g., with the first through tenth ranked variables/data elements being output via the first GUI element 522a and/or the eleventh through eighteenth ranked variables/data elements being output via the second GUI element 522b). In some embodiments, the scoring and/or ranking of data elements/variables may be conducted and/or segmented into groups of variables/data elements. As each variable/data element corresponding to the data fields 522c-1, 522c-2, 522c-3, 522c-4, 522c-5, 522c-6 may belong to a group of variables/data elements categorized as "Claim Info", for example (e.g., in the non-limiting example case where the asset/account comprises a claim of loss), a collective, average, and/or maximum score or ranking for the group may cause the interface 520 to include the third GUI element 522c. In such an embodiment, for example, a single data element/variable, such as a value of an unstructured data element evaluation (such value not being separately depicted in FIG. 5) based on the claim notes summary field 522c-6, may be determined to be in a subset of highest-ranking variables/data elements that have contributed to the assessment, and the entire grouping (and/or a subset as depicted) of "Claim Info" data elements/variables may accordingly be output via the third GUI element 522c.

According to some embodiments, the interface 520 may comprise a fourth GUI element 522d that may comprise an assessment summary area providing information descriptive of the assessment of the object, asset, and/or account. The fourth GUI element 522d may comprise, for example, a positive drivers field 522d-1, a negative drivers field 522d-2, a first assessment result output 524a, a second assessment result output 524b, and/or one or more input buttons 530a-c. The positive drivers field 522d-1 may be populated with data indicative of variables and/or data elements that have been identified as having the largest impact/weight (e.g., based on statistical analysis results as described herein) in increasing the score/assessment result, while the negative drivers field 522d-2 may be populated with data indicative of variables and/or data elements that have been identified as having the largest impact/weight (e.g., based on statistical analysis results as described herein) in decreasing the score/assessment result. The result itself may be output as a quantitative value via the first assessment result output 524a (e.g., a ninety-five percent confidence level, as shown for non-limiting example) and/or may be output as a qualitative and/or relative value via the second assessment result output 524b (e.g., a bar scale or slider showing a score position between "low" and "high" scoring bounds). In such a manner, for example, an analyst may quickly and easily review the interface 520 to make a final human determination (if deemed necessary) for the object/asset/account. According to some embodiments, the AI-determined assessment results (e.g., output via the first assessment result output 524a and/or the second assessment result output 524b) may automatically cause a process result for the object/asset/account, such as an automatic renewal, quote, acceptance, etc., e.g., in the case that the assessment result exceeds a predetermined threshold value.

In some embodiments, such as in the case that an analyst is given the opportunity to provide input via the interface 520, the interface 520 may receive input via one or more of the input buttons 530a-c. A first input button 530a may be utilized to provide input corresponding to a "Do Not Renew" (e.g., negative) decision by the analyst, for example, and/or a second input button 530b may be utilized to provide input corresponding to a "Renew" (e.g., positive) decision by the analyst. According to some embodiments, a third input button 530c may be utilized to provide input corresponding to a "Underwriting (UW) Review" decision by the analyst. Utilizing the input buttons 530a-c, for example, an analyst presented with the interface 520 may provide input defining a decision of the analyst. In some embodiments, this input may define a process result for the asset/object/account and/or may be fed back into the AI and/or ML model(s) to refine the logical processing rules thereof.

While various components of the interface 520 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

Turning now to FIG. 6, a diagram of an example interface 620 according to some embodiments is shown. In some embodiments, the interface 620 may comprise a web page, web form, database entry form, API, spreadsheet, table, map interface, and/or application or other GUI via which an assessment may be automatically detailed by AI-generated freeform textual summary data, as described herein. The interface 620 may, for example, comprise a front-end of an AI-facilitated underwriting product assessment program and/or platform programmed and/or otherwise configured to execute, conduct, and/or facilitate the method 300 of FIG. 3A and FIG. 3B herein, and/or portions thereof. In some embodiments, the interface 620 may be output via a computerized device, such as the resource devices 102a-n, 202, the third-party devices 106, 206, apparatus, 810, and/or the AI servers 110, 210 of FIG. 1, FIG. 2, and/or FIG. 8 herein.

According to some embodiments, the interface 620 may comprise one or more tabs and/or other segmented and/or logical-presented data forms and/or fields. In some embodiments, the interface 620 may be configured, assembled, generated, and/or organized automatically by execution of AI logic execution as described herein. As depicted in FIG. 6 for purposes of non-limiting example, the interface 620 may comprise an "AI Renewal Decision/Reasoning" GUI element 622a defining, e.g., different output (and/or input) areas of the interface 620. In accordance with embodiments herein, the GUI element 622a may comprise a decision data element 624, a plurality of reasoning driver elements 626a-d, an AI-generated freeform reasoning field 628, and/or one or more input buttons 630a-c. The decision data element 624 may comprise, for example, an indication of an assessment result for a particular asset, object, and/or account. In the case of the non-limiting exemplary data in FIG. 6 the decision data element 624 may output an indication such as "Renew" (or "deny", or "approve") with respect to an assessment of an underwriting product account. According to some embodiments, the decision data element 624 (and/or the underlying data thereof) may be automatically generated and/or defined by an AI-based system as described herein. In some embodiments, the provision, generation, and/or outputting of the interface 620 and/or the decision data element 624 may be conducted in response to input received from an analyst/user, such as input received via the second input button 530b of the interface 520 of FIG. 5 herein.

In some embodiments, any or all of the reasoning driver elements 626a-d may be automatically selected (e.g., by the AI system) based on results of statistical analysis of variable/data element contribution to the assessment result. The "Renew" decision/result output by the decision data element 624 may, for example, be based on a subset of variables/data elements as identified by the reasoning driver elements 626a-d. The subset may comprise, in some embodiments, a sub-population of variables/data elements that were considered in arriving at the assessment decision, but that ranked and/or scored higher than other variables/data elements in a statistical determination of the weight or effect that each variable/data element had on the final result.

According to some embodiments, the AI-generated freeform reasoning field 628 may comprise a textual summary of freeform/prose human-readable text that is autogenerated by the AI system. The AI system may utilize the subset of variables/data elements represented by the reasoning driver elements 626a-d, for example, to process through a natural language logic routine to generate the freeform reasoning field 628. In embodiments where the AI logic comprises one or more machine learning modules and/or routines, the freeform reasoning field 628 may be constructed utilizing information distilled by the routine from a freeform text data training set. Setup or initialization of the ML routine may comprise loading a large number of historical analysis assessment reasoning summaries, for example, that are parsed and analyzed by the ML module. The AI system may acquire keywords and/or phrases based on the reasoning driver elements 626a-d and utilize a natural language building routine to structure the keywords/phrases into a proper prose/paragraph form as output by the freeform reasoning field 628. This auto-generation of the textual reasoning summary may save significant time for the analyst, even in cases where the analyst is not the source of the underlying assessment decision (e.g., in the case that the AI system automatically completes the assessment on behalf of the analyst).

In some embodiments, the analyst may be provided the opportunity to enter input via the input buttons 630a-c. A first input button 630a may be utilized, for example, to (i) edit the assessment decision output by the decision data element 624, (ii) edit and/or adjust or rearrange the subset of the variables/data elements output by the reasoning driver elements 626a-d, and/or (iii) edit the freeform textual summary output by the freeform reasoning field 628. According to some embodiments, a second input button 630b may be utilized to accept the auto-generated summary and/or a third input button 630c may be utilized to proceed back to a different interface (e.g., the interface 520 of FIG. 5).

While various components of the interface 620 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

Figure 7:
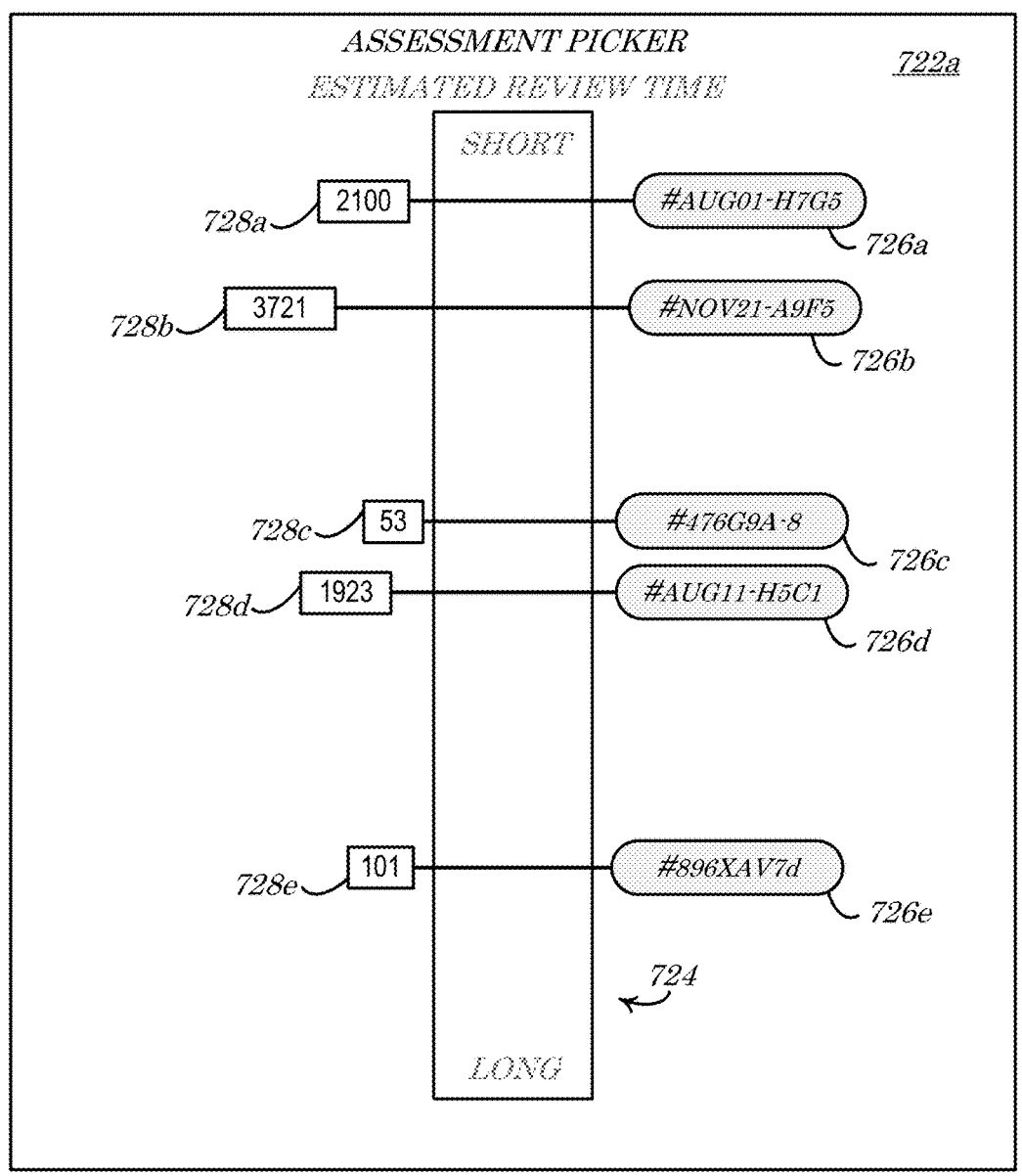
FIG. 7 is a diagram of an example interface according to some embodiments.

Referring now to FIG. 7, a diagram of an example interface 720 according to some embodiments is shown. In some embodiments, the interface 720 may comprise a web page, web form, database entry form, API, spreadsheet, table, map interface, and/or application or other GUI via which multiple AI-conducted assessments may be quickly and easily sorted, ranked, and/or selected. The interface 720 may, for example, comprise a front-end of an AI-facilitated underwriting product assessment program and/or platform programmed and/or otherwise configured to execute, conduct, and/or facilitate the method 300 of FIG. 3A and FIG. 3B herein, and/or portions thereof. In some embodiments, the interface 720 may be output via a computerized device, such as the resource devices 102a-n, 202, the third-party devices 106, 206, apparatus, 810, and/or the AI servers 110, 210 of FIG. 1, FIG. 2, and/or FIG. 8 herein.

According to some embodiments, the interface 720 may comprise one or more tabs and/or other segmented and/or logical-presented data forms and/or fields. In some embodiments, the interface 720 may be configured, assembled, generated, and/or organized automatically by execution of AI logic execution as described herein. As depicted in FIG. 7 for purposes of non-limiting example, the interface 720 may comprise an "Assessment Picker" GUI element 722a defining, e.g., different output (and/or input) areas of the interface 720. In accordance with embodiments herein, the GUI element 722a may comprise a sorting bar 724 defining a graphical range from a low point (e.g., longest estimated review time) to a high point (e.g., shortest estimated review time). In some embodiments, a plurality of assessment identifiers 726a-e may be disposed along the sorting bar 724, e.g., in accordance with respective estimated review time values (not separately shown). According to some embodiments, the interface 720 may comprise a plurality of scoring labels 728a-e corresponding to the plurality of assessment identifiers 726a-e.

In some embodiments, the values of the scores (and/or other metric) output by the plurality of scoring labels 728a-e may not correspond to the scoring/ranking with respect to the sorting bar 724 and the underlying metric thereof, but may otherwise be useful and/or desired. While a user/analyst may utilize the interface 720 to readily identify and/or select assessments that are believed to take less time to review (e.g., from the top of the sorting bar 724), the scoring labels 728a-e may provide additional information that may be useful to the analyst. While a third assessment identifier 726c may correspond to an assessment (e.g., identified as "#476G9A-8") that has the third shortest expected review time, for example, a relatively low score value (fifty-three (53)) shown by a respective third scoring label 728c may indicate that the reason that the assessment may not take long to review is because it will likely have a negative outcome. Accordingly, should the user/analyst be searching for assessments to review that are both estimated to take less time (relative to other assessments) and be likely to result in positive outcomes, the user/analyst may provide input to select one or more desired assessments from the interface 720 based on the position of the assessment identifiers 726*a-e* on the sorting bar 724 as well as based on the data output by the respective scoring labels 728*a-e*. According to some embodiments, selection and/or activation of one of the assessment identifiers 726*a-e* and/or scoring labels 728*a-e* may cause an outputting of information specific to the selected assessment(s). A mouse click on a first assessment identifier 726*a* may, for example, cause a version of the interface 520 of FIG. 5 to be output with respect to the assessment (e.g., identified as "#AUG01-H7G5") related thereto.

While various components of the interface 720 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

VI. AI GUI Generation Apparatus and Articles of Manufacture

Figure 8:
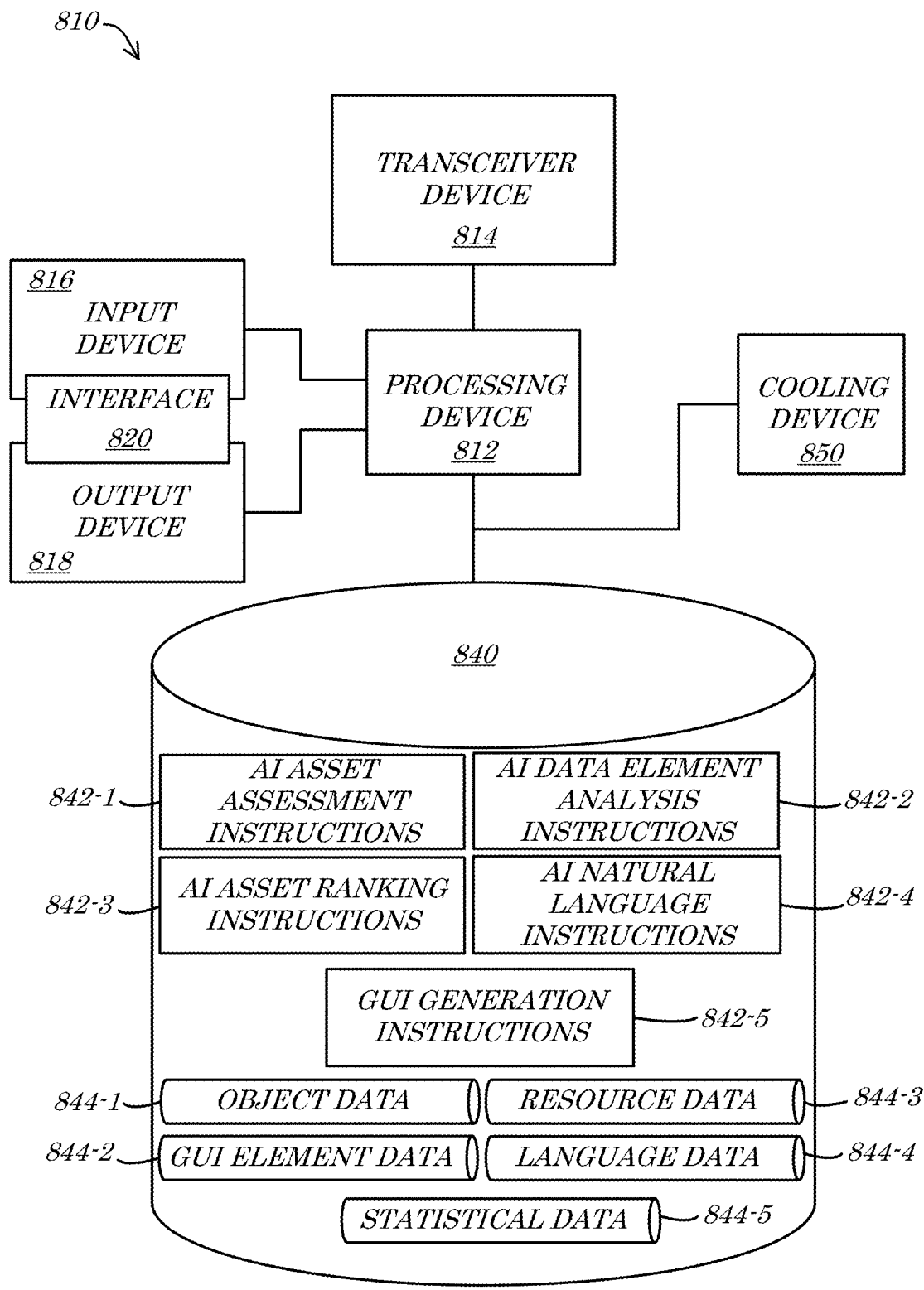
FIG. 8 is a block diagram of an apparatus according to some embodiments.
Figure 9A:
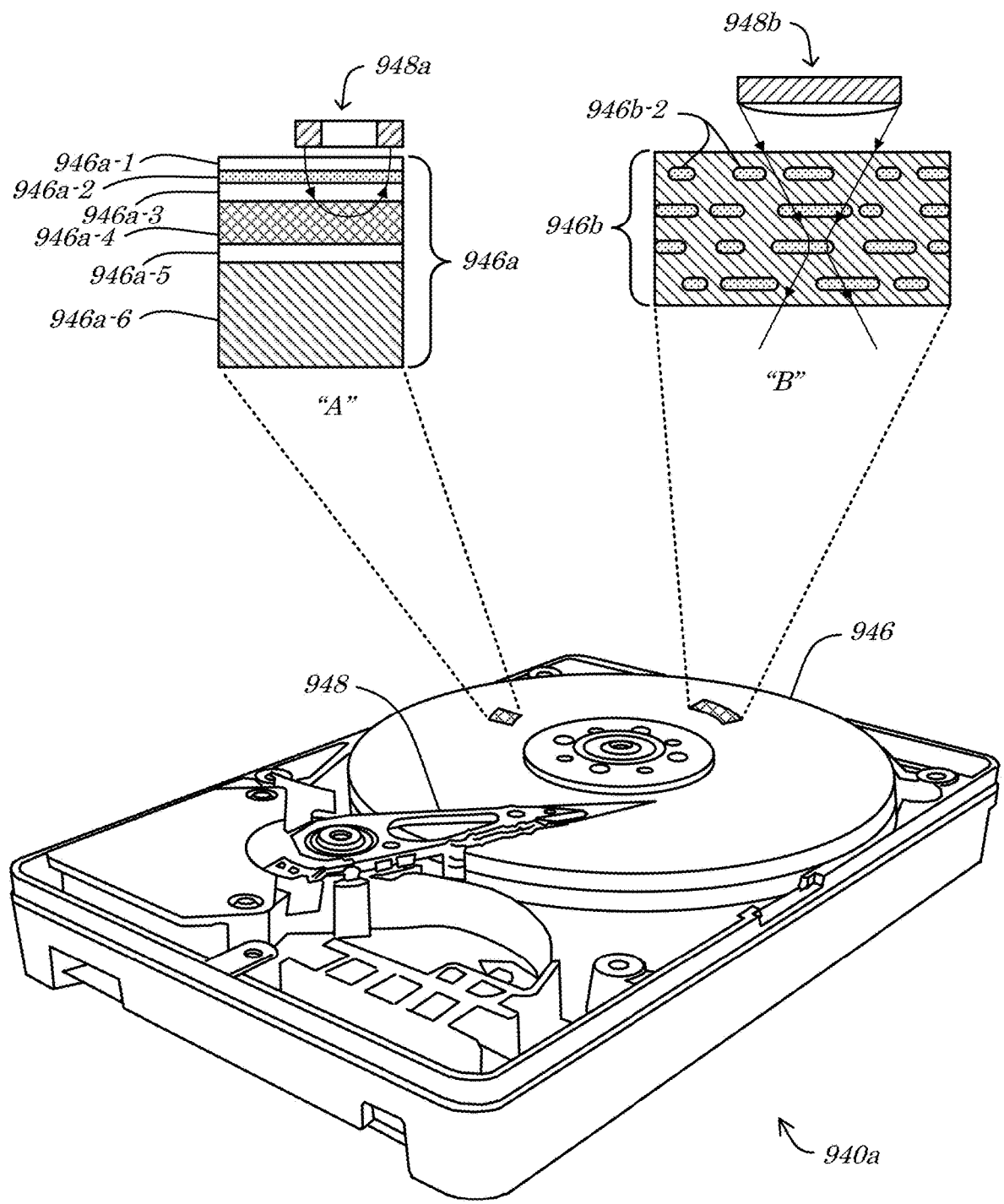
FIG. 9A, FIG. 9B, FIG. 9C, FIG. 9D, and FIG. 9E are perspective diagrams of exemplary data storage devices according to some embodiments.
Figure 9B:
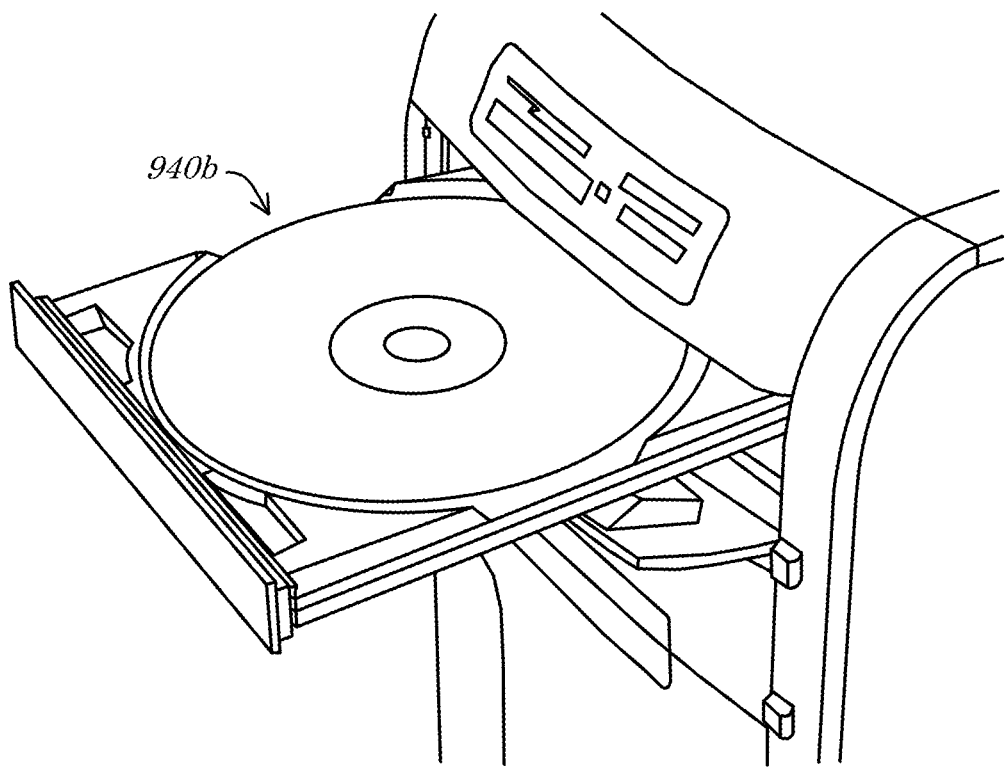
Figure 9C:
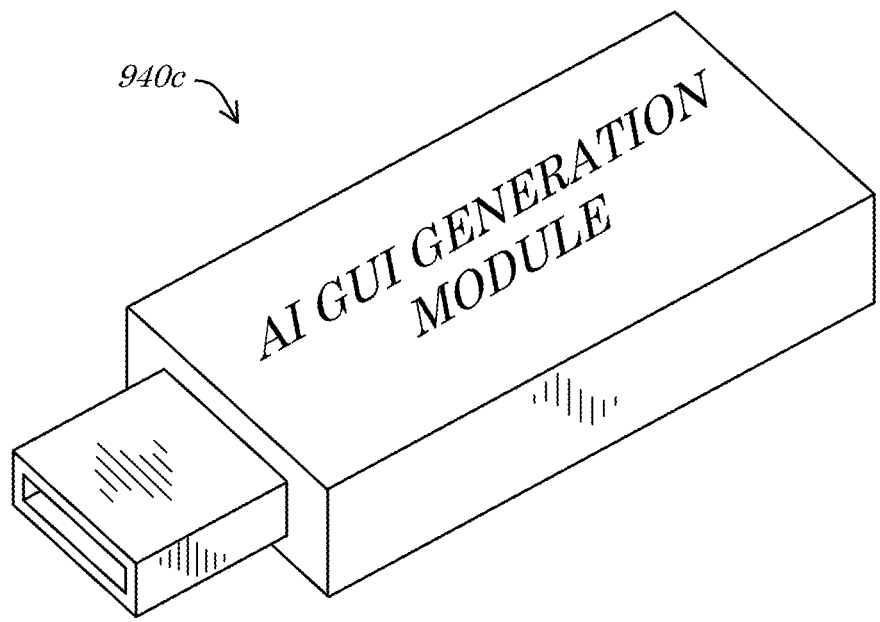
Figure 9D:
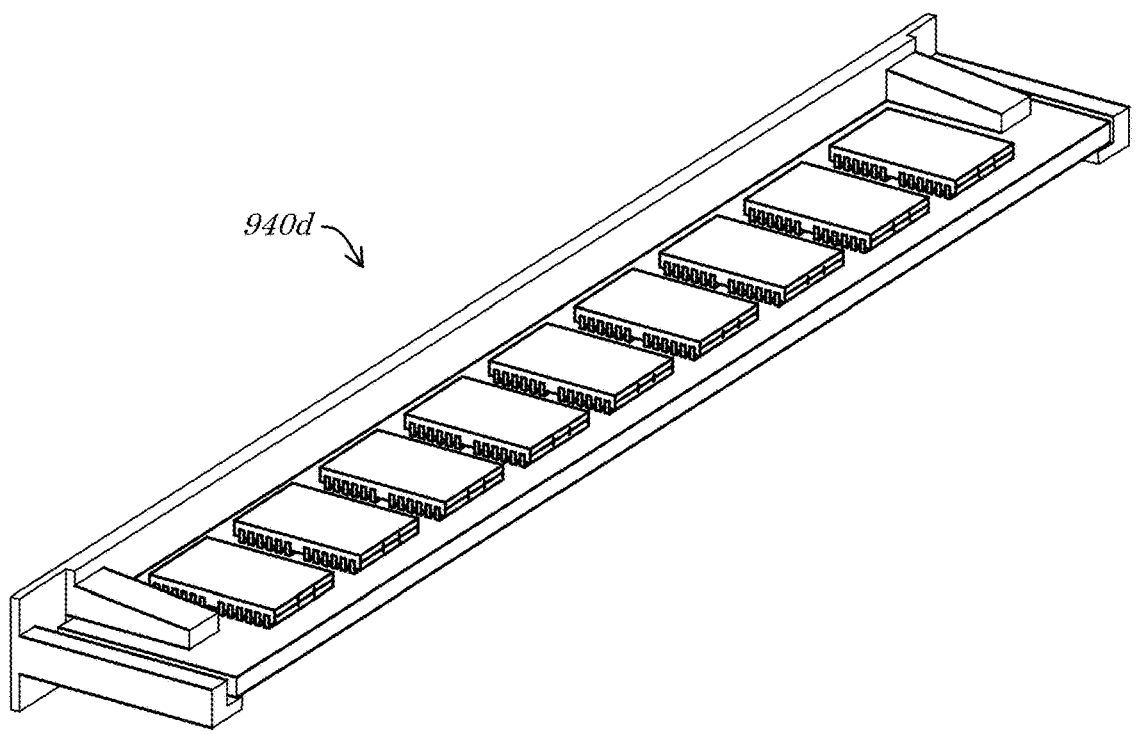
Figure 9E:
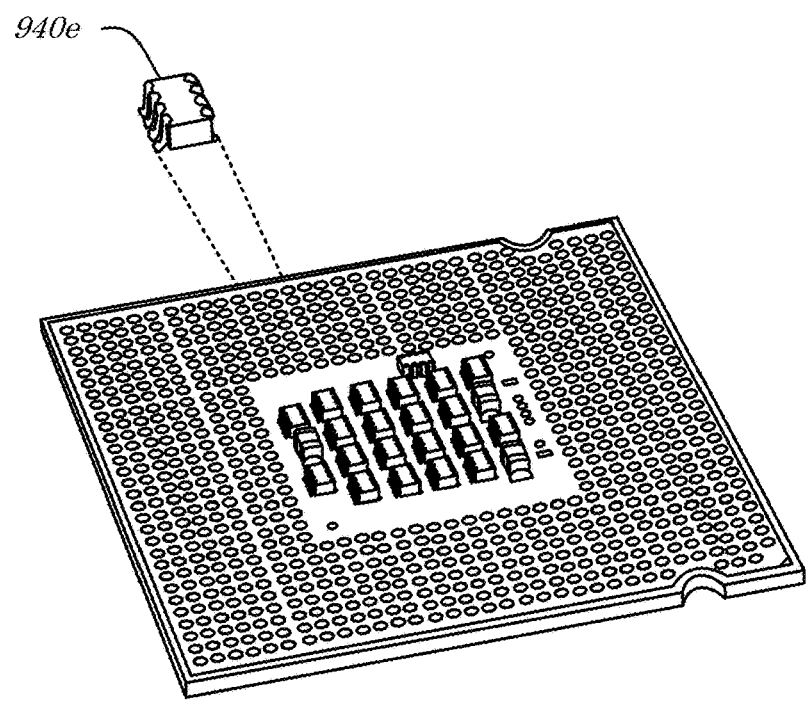

Turning to FIG. 8, a block diagram of an apparatus 810 according to some embodiments is shown. In some embodiments, the apparatus 810 may be similar in configuration and/or functionality to any of the AI servers 110, 210, the resource devices 102*a-n*, 202, and/or the third-party devices 106, 206, of FIG. 1 and/or FIG. 2 herein. The apparatus 810 may, for example, execute, process, facilitate, and/or otherwise be associated with the method 300 of FIG. 3A and FIG. 3B herein, and/or portions thereof. In some embodiments, the apparatus 810 may comprise a processing device 812, a transceiver device 814, an input device 816, an output device 818, an interface 820, a memory device 840 (storing various programs and/or instructions 842 and data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 be included in the apparatus 810 without deviating from the scope of embodiments described herein.

According to some embodiments, the processor 812 may be or include any type, quantity, and/or configuration of processor that is or becomes known. The processor 812 may comprise, for example, an Intel® IXP 2800 network processor or an Intel® XEON™ Processor coupled with an Intel® E8501 chipset. In some embodiments, the processor 812 may comprise multiple inter-connected processors, microprocessors, and/or micro-engines. According to some embodiments, the processor 812 (and/or the apparatus 810 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 810 comprises a server such as a blade server, necessary power may be supplied via a standard AC outlet, power strip, surge protector, and/or Uninterruptible Power Supply (UPS) device.

In some embodiments, the transceiver device 814 may comprise any type or configuration of communication device that is or becomes known or practicable. The transceiver device 814 may, for example, comprise a Network Interface Card (NIC), a telephonic device, a cellular network device, a router, a hub, a modem, and/or a communications port or cable. In some embodiments, the transceiver device 814 may be coupled to receive sensor data from one or more sensors (not separately depicted), such as in the case that the apparatus 810 is utilized to analyze video/images and/or other data. The transceiver device 814 may, for example, comprise a BLE and/or RF receiver device that acquires broadcast and/or transmitted sensor data and/or a transmitter device that provides such data to a remote server (not shown). According to some embodiments, the transceiver device 814 may also or alternatively be coupled to the processor 812. In some embodiments, the transceiver device 814 may comprise an IR, RF, Bluetooth™, Near-Field Communication (NFC), and/or Wi-Fi® network device coupled to facilitate communications between the processor 812 and another device (such as a mobile resource and/or customer device, not shown in FIG. 8).

In some embodiments, the input device 816 and/or the output device 818 are communicatively coupled to the processor 812 (e.g., via wired and/or wireless connections and/or pathways) and they may generally comprise any types or configurations of input and output components and/or devices that are or become known, respectively. The input device 816 may comprise, for example, a keyboard that allows an operator of the apparatus 810 to interface with the apparatus 810 (e.g., by an underwriting and/or analysis resource). In some embodiments, the input device 816 may comprise a sensor, such as a receiver, a camera, a proximity sensor, a signal strength meter, etc. The output device 818 may, according to some embodiments, comprise a display screen and/or other practicable output component and/or device. The output device 818 may, for example, provide the interface 820 (such as the interfaces 220, 520, 620, 720 of FIG. 2, FIG. 5, FIG. 6, and/or FIG. 7 herein) via which AI assessment and dynamic UI generation functionality are provided to a user (e.g., via a website and/or mobile application). According to some embodiments, the input device 816 and/or the output device 818 may comprise and/or be embodied in a single device such as a touch-screen monitor.

The memory device 840 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of AI asset assessment instructions 842-1, AI data element analysis instructions 842-2, AI asset ranking instructions 842-3, AI natural language instructions 842-4, GUI generation instructions 842-5, object data 844-1, GUI element data 844-2, resource data 844-3, language data 844-4, and/or statistical data 844-5. In some embodiments, the AI asset assessment instructions 842-1, AI data element analysis instructions 842-2, AI asset ranking instructions 842-3, AI natural language instructions 842-4, GUI generation instructions 842-5, object data 844-1, GUI element data 844-2, resource data 844-3, language data 844-4, and/or statistical data 844-5 may be utilized by the processor 812 to provide output information via the output device 818 and/or the transceiver device 814.

According to some embodiments, the AI asset assessment instructions 842-1 may be operable to cause the processor 812 to process the object data 844-1, GUI element data 844-2, resource data 844-3, language data 844-4, and/or statistical data 844-5 in accordance with embodiments as described herein. Object data 844-1, GUI element data 844-2, resource data 844-3, language data 844-4, and/or statistical data 844-5 received via the input device 816 and/or the transceiver device 814 may, for example, be analyzed, sorted, filtered, decoded, decompressed, ranked, scored, plotted, and/or otherwise processed by the processor 812 in accordance with the AI asset assessment instructions 842-1. In some embodiments, object data 844-1, GUI element data 844-2, resource data 844-3, language data 844-4, and/or statistical data 844-5 may be fed by the processor 812 through one or more mathematical and/or statistical formulas and/or models in accordance with the AI asset assessment instructions 842-1 to evaluate one or more objects, assets, and/or accounts utilizing a set of AI-implemented logical rules and/or routines, as described herein.

In some embodiments, the AI data element analysis instructions 842-2 may be operable to cause the processor 812 to process the object data 844-1, GUI element data 844-2, resource data 844-3, language data 844-4, and/or statistical data 844-5 in accordance with embodiments as described herein. Object data 844-1, GUI element data 844-2, resource data 844-3, language data 844-4, and/or statistical data 844-5 received via the input device 816 and/or the transceiver device 814 may, for example, be analyzed, sorted, filtered, decoded, decompressed, ranked, scored, plotted, and/or otherwise processed by the processor 812 in accordance with the AI data element analysis instructions 842-2. In some embodiments, object data 844-1, GUI element data 844-2, resource data 844-3, language data 844-4, and/or statistical data 844-5 may be fed by the processor 812 through one or more mathematical and/or statistical formulas and/or models in accordance with the AI data element analysis instructions 842-2 to score, rank, and/or sort variables/data elements that have been evaluated as part of the assessment and/or to define one or more groups or subsets of all utilized variables/data elements, as described herein.

According to some embodiments, the AI asset ranking instructions 842-3 may be operable to cause the processor 812 to process the object data 844-1, GUI element data 844-2, resource data 844-3, language data 844-4, and/or statistical data 844-5 in accordance with embodiments as described herein. Object data 844-1, GUI element data 844-2, resource data 844-3, language data 844-4, and/or statistical data 844-5 received via the input device 816 and/or the transceiver device 814 may, for example, be analyzed, sorted, filtered, decoded, decompressed, ranked, scored, plotted, and/or otherwise processed by the processor 812 in accordance with the AI asset ranking instructions 842-3. In some embodiments, object data 844-1, GUI element data 844-2, resource data 844-3, language data 844-4, and/or statistical data 844-5 may be fed by the processor 812 through one or more mathematical and/or statistical formulas and/or models in accordance with the AI asset ranking instructions 842-3 evaluate (e.g., via statistical regression analysis), score, rank, and/or sort a plurality of assessments for various assets, objects, and/or accounts, as described herein.

In some embodiments, the AI natural language instructions 842-4 may be operable to cause the processor 812 to process the object data 844-1, GUI element data 844-2, resource data 844-3, language data 844-4, and/or statistical data 844-5 in accordance with embodiments as described herein. Object data 844-1, GUI element data 844-2, resource data 844-3, language data 844-4, and/or statistical data 844-5 received via the input device 816 and/or the transceiver device 814 may, for example, be analyzed, sorted, filtered, decoded, decompressed, ranked, scored, plotted, and/or otherwise processed by the processor 812 in accordance with the AI natural language instructions 842-4. In some embodiments, object data 844-1, GUI element data 844-2, resource data 844-3, language data 844-4, and/or statistical data 844-5 may be fed by the processor 812 through one or more mathematical and/or statistical formulas and/or models in accordance with the AI natural language instructions 842-4 to define, generate, and/or output a natural language and/or freeform text phrase, sentence, and/or paragraph, as described herein.

According to some embodiments, the GUI generation instructions 842-5 may be operable to cause the processor 812 to process the object data 844-1, GUI element data 844-2, resource data 844-3, language data 844-4, and/or statistical data 844-5 in accordance with embodiments as described herein. Object data 844-1, GUI element data 844-2, resource data 844-3, language data 844-4, and/or statistical data 844-5 received via the input device 816 and/or the transceiver device 814 may, for example, be analyzed, sorted, filtered, decoded, decompressed, ranked, scored, plotted, and/or otherwise processed by the processor 812 in accordance with the GUI generation instructions 842-5. In some embodiments, object data 844-1, GUI element data 844-2, resource data 844-3, language data 844-4, and/or statistical data 844-5 may be fed by the processor 812 through one or more mathematical and/or statistical formulas and/or models in accordance with the GUI generation instructions 842-5 automatically assemble and/or generate an interface with dynamically selected GUI elements, as described herein According to some embodiments, the apparatus 810 may comprise the cooling device 850. According to some embodiments, the cooling device 850 may be coupled (physically, thermally, and/or electrically) to the processor 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

Referring to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data such as the AI assessment instructions 842-1, AI data element analysis instructions 842-2, AI asset ranking instructions 842-3, AI natural language instructions 842-4, GUI generation instructions 842-5, object data 844-1, GUI element data 844-2, resource data 844-3, language data 844-4, and/or statistical data 844-5, each of which is presented in reference to FIG. 8 herein. In some embodiments, instructions stored on the data storage devices 940a-e may, when executed by a processor, cause the implementation of and/or facilitate the method 300 of FIG. 3A and FIG. 3B herein, and/or portions thereof.

According to some embodiments, the first data storage device 940a may comprise one or more various types of internal and/or external hard drives. The first data storage device 940a may, for example, comprise a data storage medium 946 that is read, interrogated, and/or otherwise communicatively coupled to and/or via a disk reading device 948. In some embodiments, the first data storage device 940a and/or the data storage medium 946 may be configured to store information utilizing one or more magnetic, inductive, and/or optical means (e.g., magnetic, inductive, and/or optical-encoding). The data storage medium 946, depicted as a first data storage medium 946a for example (e.g., breakout cross-section "A"), may comprise one or more of a polymer layer 946a-1, a magnetic data storage layer 946a-2, a non-magnetic layer 946a-3, a magnetic base layer 946a-4, a contact layer 946a-5, and/or a substrate layer 946a-6. According to some embodiments, a magnetic read head 948a may be coupled and/or disposed to read data from the magnetic data storage layer 946a-2.

In some embodiments, the data storage medium 946, depicted as a second data storage medium 946b for example (e.g., breakout cross-section "B"), may comprise a plurality of data points 946b-2 disposed with the second data storage medium 946b. The data points 946b-2 may, in some embodiments, be read and/or otherwise interfaced with via a laser-enabled read head 948b disposed and/or coupled to direct a laser beam through the second data storage medium 946b.

In some embodiments, the second data storage device 940b may comprise a CD, CD-ROM, DVD, Blu-Ray™ Disc, and/or other type of optically-encoded disk and/or other storage medium that is or becomes know or practicable. In some embodiments, the third data storage device 940c may comprise a USB keyfob, dongle, and/or other type of flash memory data storage device that is or becomes know or practicable. In some embodiments, the fourth data storage device 940d may comprise RAM of any type, quantity, and/or configuration that is or becomes practicable and/or desirable. In some embodiments, the fourth data storage device 940d may comprise an off-chip cache such as a Level 2 (L2) cache memory device. According to some embodiments, the fifth data storage device 940e may comprise an on-chip memory device such as a Level 1 (L1) cache memory device.

The data storage devices 940a-e may generally store program instructions, code, and/or modules that, when executed by a processing device cause a particular machine to function in accordance with one or more embodiments described herein. The data storage devices 940a-e depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media).

VII. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

As utilized herein, the term User Interface (UI) may generally refer to any quantity and/or configuration of interface elements operable to be interacted with by a user. Some UI instances may comprise only output elements while other UI instances may comprise any combination of input and/or output elements. According to some embodiments, a Graphical UI (GUI) may comprise one or more UI elements that are graphical in nature. "Graphical" refers to elements that are visually-perceptible and/or constructed. In the context of a UI/GUI output by an electronic display device, GUI elements may comprise various interactive visual objects such as text boxes, picklists, drop-down menus, radio buttons, etc.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system for Artificial Intelligence (AI) User Interface (UI) assembly, comprising:
a plurality of electronic processing devices;
an electronic communication device in communication with at least one of the electronic processing devices from the plurality of electronic processing devices;
an electronic output device in communication with at least one of the electronic processing devices from the plurality of electronic processing devices; and
a non-transitory computer-readable memory device in communication with the plurality of electronic processing devices, the non-transitory computer-readable memory device storing (i) asset data, (ii) machine learning instructions, (iii) contribution threshold data, (iv) a plurality of UI object definitions, and (v) instructions that when executed by the plurality of electronic processing devices, result in:
receiving, by the electronic communication device, data indicative of an asset identifier;
retrieving, from the asset data and based on the data indicative of the asset identifier, a subset of the asset data corresponding to the data indicative of the asset identifier;
computing, by an execution of the machine learning instructions by the plurality of electronic processing devices, and utilizing a plurality of data elements from the asset data, a score for an asset represented by the asset identifier;
computing, based on the computing of the asset score, and for each data element from the plurality of data elements from the subset of the asset data that contributed to the score for the asset, a contribution metric value;
ranking the plurality of data elements based on the contribution metric values;
selecting, by an application of the contribution threshold data to the ranking, a subset of the plurality of data elements;
identifying, from the plurality of UI object definitions and based on the subset of the plurality of data elements, a subset of the UI object definitions that correspond to the data elements from the subset of the plurality of data elements;
assembling, utilizing the subset of the UI object definitions that correspond to the subset of the plurality of data elements, a UI instance; and
outputting, by the electronic output device, the UI instance.

2. The system of claim 1, wherein the subset of the asset data corresponding to the data indicative of the asset identifier comprises (i) numeric data, (ii) image data, and (iii) text data.

3. The system of claim 2, wherein the machine learning instructions comprise instructions defining word frequency and encoded meaning rules.

4. The system of claim 2, wherein the machine learning instructions comprise instructions defining object recognition rules.

5. The system of claim 2, wherein the machine learning instructions comprise instructions defining mathematical calculation rules.

6. The system of claim 1, wherein the instructions, when executed by the plurality of electronic processing devices, further result in:
preparing machine learning training data comprising previous asset data and previous corresponding results for a plurality of previously analyzed assets; and developing the machine learning instructions by training the machine learning instructions utilizing the machine learning training data.

7. The system of claim 6, wherein the instructions, when executed by the plurality of electronic processing devices, further result in:
receiving, by the electronic communication device, data indicative of a human evaluation of the score for the asset;
adding the data indicative of a human evaluation of the score for the asset to the machine learning training data; and
updating the machine learning instructions by training the machine learning instructions utilizing the machine learning training data with the added data indicative of a human evaluation of the score for the asset to the machine learning training data.

8. The system of claim 1, wherein the instructions, when executed by the plurality of electronic processing devices, further result in:
identifying a plurality of other scores for other assets;
identifying, an additional UI object definition from the plurality of UI object definitions, the additional UI object definition comprising a graphical element depicting a distribution of values corresponding to the score for the asset and the plurality of other scores for other assets; and
wherein the assembling of the UI instance further utilizes the additional UI object definition.

9. The system of claim 1, wherein the instructions, when executed by the plurality of electronic processing devices, further result in:
identifying, utilizing the subset of the plurality of data elements, a plurality of text elements relevant to the subset of the plurality of data elements;
generating, utilizing the plurality of text elements relevant to the subset of the plurality of data elements, at least one sentence descriptive of the score for the asset; and
outputting, by the electronic output device and via the UI instance, an indication of the at least one sentence descriptive of the score for the asset.

10. The system of claim 1, wherein the contribution metric values comprise F-scores.

11. The system of claim 1, wherein the assembling of the UI instance, comprises:
identifying for each UI object definition of the subset of the UI object definitions that correspond to the subset of the plurality of data elements, at least one dimensional value;
identifying at least one dimensional constraint of the electronic output device; and
computing, based on an analysis of the at least one dimensional value for each UI object definition of the subset of the UI object definitions that correspond to the subset of the plurality of data elements and the at least one dimensional constraint of the electronic output device, an arrangement of the subset of the UI object definitions that correspond to the subset of the plurality of data elements.

12. The system of claim 1, wherein the identifying of the subset of the UI object definitions that correspond to the data elements from the subset of the plurality of data elements, comprises:
querying, utilizing an identifier of each data element from the subset of the plurality of data elements, a UI object definition library storing the plurality of UI object definitions; and receiving, in response to the query and based on stored data linkages between the identifiers of the data element from the subset of the plurality of data elements and identifiers of the plurality of UI object definitions, an indication of the subset of the UI object definitions.

13. The system of claim 1, wherein at least one data element from the plurality of data elements from the subset of the asset data that contributed to the score for the asset comprises at least one of: (i) a type of insurance product of the asset, (ii) a street address of the asset, (iii) a geolocation coordinate of the asset, (iv) an age of a roof of the asset, (v) a narrative describing the asset, (vi) a year of construction of the asset, and (vii) a construction type of the asset.

14. The system of claim 1, wherein at least one data element from the plurality of data elements from the subset of the asset data that contributed to the score for the asset comprises at least one of: (i) a condition of a roof of the asset, (ii) an underwriting tier of an insurance policy for the asset, (iii) a flood zone of the asset, (iv) a claim history for an insurance policy for the asset, and (v) a risk rating of the asset.

15. A method for Artificial Intelligence (AI) User Interface (UI) assembly, comprising:
receiving, by an electronic communication device in communication with at least one electronic processing device of a plurality of electronic processing devices, data indicative of an asset identifier;
retrieving, by the at least one electronic processing device and from asset data stored in a non-transitory computer-readable memory device in communication with the at least one electronic processing device, and based on the data indicative of the asset identifier, a subset of the asset data corresponding to the data indicative of the asset identifier;
computing, by an execution, by the at least one electronic processing device, of machine learning instructions stored in the non-transitory computer-readable memory device, and utilizing a plurality of data elements from the asset data, a score for an asset represented by the asset identifier;
computing, by the at least one electronic processing device and based on the computing of the asset score, and for each data element from the plurality of data elements from the subset of the asset data that contributed to the score for the asset, a contribution metric value;
ranking, by the at least one electronic processing device, the plurality of data elements based on the contribution metric values;
selecting, by the at least one electronic processing device and by an application of contribution threshold data stored in the non-transitory computer-readable memory device, to the ranking, a subset of the plurality of data elements;
identifying, by the at least one electronic processing device and from a plurality of UI object definitions stored in the non-transitory computer-readable memory device, and based on the subset of the plurality of data elements, a subset of the UI object definitions that correspond to the data elements from the subset of the plurality of data elements;
assembling, by the at least one electronic processing device and utilizing the subset of the UI object definitions that correspond to the subset of the plurality of data elements, a UI instance; and outputting, by an electronic output device in communication with the at least one processing device, the UI instance.

16. The method of claim 15, wherein the subset of the asset data corresponding to the data indicative of the asset identifier comprises (i) numeric data, (ii) image data, and (iii) text data.

17. The method of claim 16, wherein the machine learning instructions comprise instructions defining word frequency and encoded meaning rules.

18. The method of claim 16, wherein the machine learning instructions comprise instructions defining object recognition rules.

19. The method of claim 16, wherein the machine learning instructions comprise instructions defining mathematical calculation rules.

20. The method of claim 15, further comprising:
preparing, by the at least one electronic processing device, machine learning training data comprising previous asset data and previous corresponding results for a plurality of previously analyzed assets; and
developing, by the at least one electronic processing device, the machine learning instructions by training the machine learning instructions utilizing the machine learning training data.

21. The method of claim 20, further comprising:
receiving, by the electronic communication device, data indicative of a human evaluation of the score for the asset;
adding, by the at least one electronic processing device, the data indicative of a human evaluation of the score for the asset to the machine learning training data; and
updating, by the at least one electronic processing device, the machine learning instructions by training the machine learning instructions utilizing the machine learning training data with the added data indicative of a human evaluation of the score for the asset to the machine learning training data.

22. The method of claim 15, further comprising:
identifying, by the at least one electronic processing device, a plurality of other scores for other assets;
identifying, by the at least one electronic processing device, an additional UI object definition from the plurality of UI object definitions, the additional UI object definition comprising a graphical element depicting a distribution of values corresponding to the score for the asset and the plurality of other scores for other assets; and
wherein the assembling of the UI instance further utilizes the additional UI object definition.

23. The method of claim 15, further comprising:
identifying, by the at least one electronic processing device and utilizing the subset of the plurality of data elements, a plurality of text elements relevant to the subset of the plurality of data elements;
generating, by the at least one electronic processing device and utilizing the plurality of text elements relevant to the subset of the plurality of data elements, at least one sentence descriptive of the score for the asset; and
outputting, by the electronic output device and via the UI instance, an indication of the at least one sentence descriptive of the score for the asset.

24. The method of claim 15, wherein the contribution metric values comprise F-scores.

25. The method of claim 15, wherein the assembling of the UI instance, comprises:
identifying for each UI object definition of the subset of the UI object definitions that correspond to the subset of the plurality of data elements, at least one dimensional value;
identifying at least one dimensional constraint of the electronic output device; and
computing, based on an analysis of the at least one dimensional value for each UI object definition of the subset of the UI object definitions that correspond to the subset of the plurality of data elements and the at least one dimensional constraint of the electronic output device, an arrangement of the subset of the UI object definitions that correspond to the subset of the plurality of data elements.

26. The method of claim 15, wherein the identifying of the subset of the UI object definitions that correspond to the data elements from the subset of the plurality of data elements, comprises:
querying, utilizing an identifier of each data element from the subset of the plurality of data elements, a UI object definition library storing the plurality of UI object definitions; and
receiving, in response to the query and based on stored data linkages between the identifiers of the data element from the subset of the plurality of data elements and identifiers of the plurality of UI object definitions, an indication of the subset of the UI object definitions.

27. The method of claim 15, wherein at least one data element from the plurality of data elements from the subset of the asset data that contributed to the score for the asset comprises at least one of: (i) a type of insurance product of the asset, (ii) a street address of the asset, (iii) a geolocation coordinate of the asset, (iv) an age of a roof of the asset, (v) a narrative describing the asset, (vi) a year of construction of the asset, and (vii) a construction type of the asset.

28. The method of claim 15, wherein at least one data element from the plurality of data elements from the subset of the asset data that contributed to the score for the asset comprises at least one of: (i) a condition of a roof of the asset, (ii) an underwriting tier of an insurance policy for the asset, (iii) a flood zone of the asset, (iv) a claim history for an insurance policy for the asset, and (v) a risk rating of the asset.

* * * * *